United States Patent
Yoon et al.

(10) Patent No.: US 11,455,914 B2
(45) Date of Patent: Sep. 27, 2022

(54) DISPLAY DEVICE

(71) Applicant: Samsung Display Co., LTD., Yongin-si (KR)

(72) Inventors: Hyoyul Yoon, Seoul (KR); Min-Sung Kim, Hwaseong-si (KR); Jae Hoon Jeong, Bucheon-si (KR); Hansun Ryou, Seoul (KR); Kyoungah Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 23 days.

(21) Appl. No.: 16/951,204

(22) Filed: Nov. 18, 2020

(65) Prior Publication Data

US 2021/0256881 A1    Aug. 19, 2021

(30) Foreign Application Priority Data

Feb. 14, 2020   (KR) .................. 10-2020-0018043

(51) Int. Cl.
*G09F 9/30* (2006.01)
*G06F 1/16* (2006.01)

(52) U.S. Cl.
CPC ............ *G09F 9/301* (2013.01); *G06F 1/1601* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 10,191,516 B2 | 1/2019 | Jang et al. | |
| 10,230,062 B2 | 3/2019 | Kim et al. | |
| 10,429,895 B2 | 10/2019 | Lee | |
| 10,678,299 B2* | 6/2020 | Jung | G06F 1/1652 |
| 10,698,446 B2* | 6/2020 | Kim | G06F 1/1652 |
| 10,754,382 B2* | 8/2020 | Nam | H01L 27/3244 |
| 10,966,328 B2* | 3/2021 | Choi | B32B 27/36 |
| 10,969,828 B2* | 4/2021 | Kim | G06F 1/1652 |
| 11,074,836 B2* | 7/2021 | Shin | G09F 9/301 |
| 11,221,648 B2* | 1/2022 | Myeong | G06F 1/1616 |
| 11,227,515 B2* | 1/2022 | Kim | G09F 9/301 |
| 2018/0150102 A1 | 5/2018 | Lee et al. | |
| 2019/0213924 A1 | 7/2019 | Ha et al. | |
| 2019/0377383 A1* | 12/2019 | Kim | G06F 3/04886 |
| 2020/0260596 A1* | 8/2020 | Park | H01L 51/0097 |
| 2021/0104693 A1* | 4/2021 | Cho | B32B 3/14 |
| 2021/0109566 A1* | 4/2021 | Myeong | G06F 1/1681 |
| 2021/0256881 A1* | 8/2021 | Yoon | G06F 1/1601 |

FOREIGN PATENT DOCUMENTS

| | | |
|---|---|---|
| KR | 1020180006530 A | 1/2018 |
| KR | 1020180062273 A | 6/2018 |
| KR | 1020180062275 A | 6/2018 |
| KR | 1020190052954 A | 5/2019 |
| KR | 1020190082339 A | 7/2019 |

* cited by examiner

*Primary Examiner* — Lisa Lea-Edmonds
(74) *Attorney, Agent, or Firm* — Cantor Colburn LLP

(57) ABSTRACT

A display device includes a display panel including a folding area at which the display device is foldable or unfoldable about a folding axis and a non-folding area adjacent to the folding area, a supporter which faces the folding area and the non-folding area, and in the folding area, a pad between the display panel and the supporter, the pad protruding from the supporter to the display panel and extending parallel to the folding axis.

20 Claims, 15 Drawing Sheets

DISPLAY DEVICE

This application claims priority to Korean Patent Application No. 10-2020-0018043 filed on Feb. 14, 2020, and all the benefits accruing therefrom under 35 U.S.C. § 119, the disclosure of which is hereby incorporated by reference in its entirety.

BACKGROUND

(1) Field

The invention relates to a display device, and more particularly, to a display device having improved deformation at a folding area of the display device.

(2) Description of the Related Art

Electronic products such as smart phones, digital cameras, laptop computers, navigation systems and smart televisions include a display device for displaying an image. The display device generates an image and provides the image displayed on a display screen of the display device.

With the advancement of display technology, various types of display devices have been being developed. A flexible display device may be curvedly deformable, foldable or rollable. The flexible display device capable of being deformed in various shapes allows for improvement in portability and use of the display device.

SUMMARY

Among the flexible display devices, the foldable display device is foldable with respect to a folding axis extending in one direction. However, when the foldable display device is repeatedly folded and unfolded at a folding area of the display device, deformation may occur at the folding area and such deformation may be visually recognized from outside the display device.

One or more embodiment provides a display device which reduces or effectively prevents recognition of deformation at a folding area of the display device.

According to an embodiment, a display device includes a display panel including a folding area at which the display device is foldable or unfoldable about a folding axis and a non-folding area adjacent to the folding area, a supporter which faces the folding area and the non-folding area, and in the folding area, a pad between the display panel and the supporter, the pad protruding from the supporter to the display panel and extending parallel to the folding axis.

In an embodiment, the non-folding area may include a plurality of non-folding areas including a first non-folding area and a second non-folding area, the folding area may be between the first non-folding area and the second non-folding area, the supporter may include a plurality of supporters including a first supporter which corresponds to the first non-folding area and a second supporter which corresponds to the second non-folding area, and the pad may include a first pad on a first supporter and corresponding to the folding area and a second pad on a second supporter and corresponding to the folding area.

In an embodiment, a height of the pad may decrease in a direction from a center of the folding area toward a boundary between the folding area and the non-folding area.

In an embodiment, a bottom surface of the pad may be a flat surface parallel to a top surface of the supporter. The top surface of the pad may be curved.

In an embodiment, the display device may further include a subsidiary pad between the display panel and the supporter, protruding from the supporter to the display panel and extending parallel to the folding axis, and corresponding to the non-folding area.

In an embodiment, a height of the subsidiary pad may decrease in a direction from the non-folding area toward a center of the folding area.

In an embodiment, the display device which is in-folded about the folding axis may dispose portions of the top surface of the display panel facing each other.

In an embodiment, the display device may further include a cushion layer between the display panel and the supporter.

In an embodiment, the pad may be between the cushion layer and the supporter.

In an embodiment, the pad may be between the display panel and the cushion layer.

In an embodiment, the supporter may include a plurality of supporters including an upper supporter and a lower supporter which faces the display panel with the upper supporter therebetween. The pad may be between the upper supporter and the lower supporter.

According to an embodiment, a display device includes a display panel including a folding area at which the display device is foldable or unfoldable about a folding axis, and a non-folding area adjacent to the folding area, a supporter which faces the non-folding area, and in the non-folding area, a pad between the display panel and the supporter, the pad protruding from the supporter to the display panel and extending parallel to the folding axis.

In an embodiment, the non-folding area may include a plurality of non-folding areas including a first non-folding area and a second non-folding area spaced apart from each other with the folding area therebetween, the supporter may include a plurality of supporters including a first supporter which corresponds to the first non-folding area and a second supporter which corresponds to the second non-folding area, and the pad may include a plurality of pads including a first pad which corresponds to the first supporter, and a second pad which corresponds to the second supporter and is spaced apart from the first pad.

In an embodiment, a height of the pad may decrease in a direction toward a center of the folding area from the non-folding area.

In an embodiment, the pad may extend in a direction toward a center of the folding area from the non-folding area to dispose a portion of the pad in the folding area.

In an embodiment, the display device which is out-folded about the folding axis may dispose portions of the top surface of the display panel facing away from each other.

In an embodiment, the display device may further include a cushion layer between the display panel and the supporter. The pad may be between the cushion layer and the supporter.

In an embodiment, the supporter includes a plurality of supporters including an upper supporter, and a lower supporter which faces the display panel with the upper supporter therebetween. The pad may be between the upper supporter and the lower supporter, the pad protruding from the lower supporter to the upper supporter.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1:
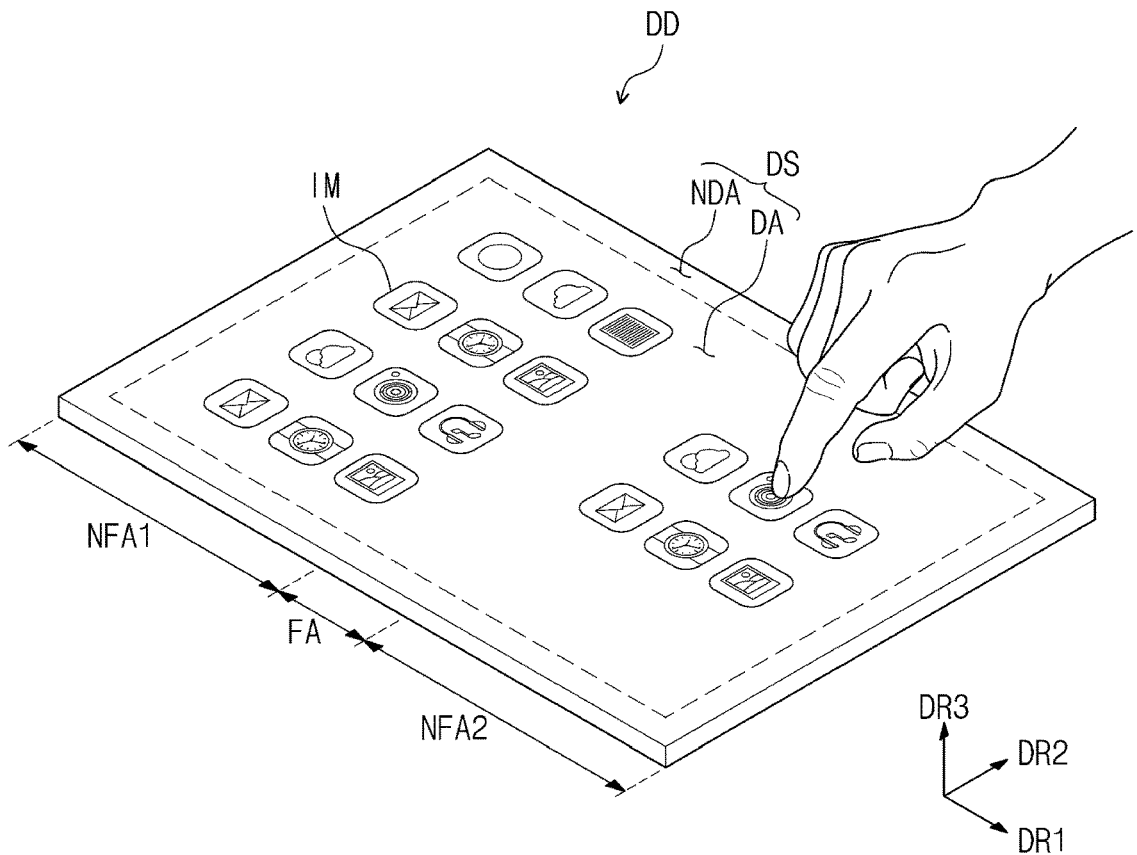
FIG. 1 illustrates a perspective view showing an embodiment of a display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this description, when a component (or region, layer, portion, etc.) is referred to as being related to another component such as being "on," "connected to" or "coupled to" other component(s), the component may be directly disposed on, directly connected to or directly coupled to the other component(s) (i.e., with no intervening component therebetween) or at least one intervening component may be present therebetween.

Like numerals indicate like components. Moreover, in the drawings, thicknesses, ratios, and dimensions of components are exaggerated for effectively explaining the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the invention. Unless the context clearly indicates otherwise, the singular forms are intended to include the plural forms as well.

In addition, the terms "beneath," "lower," "above," "upper" and the like are used herein to describe one component's relationship to other component(s) illustrated in the drawings. The relative terms are intended to encompass different orientations in addition to the orientation depicted in the drawings.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

It should be understood that the terms "comprise," "include," "have" and the like are used to specify the presence of stated features, integers, steps, operations, components, elements, or combinations thereof, but do not preclude the presence or addition of one or more other features, integers, steps, operations, components, elements, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The following will now describe in detail embodiments of the invention in conjunction with the accompanying drawings.

Figure 2:
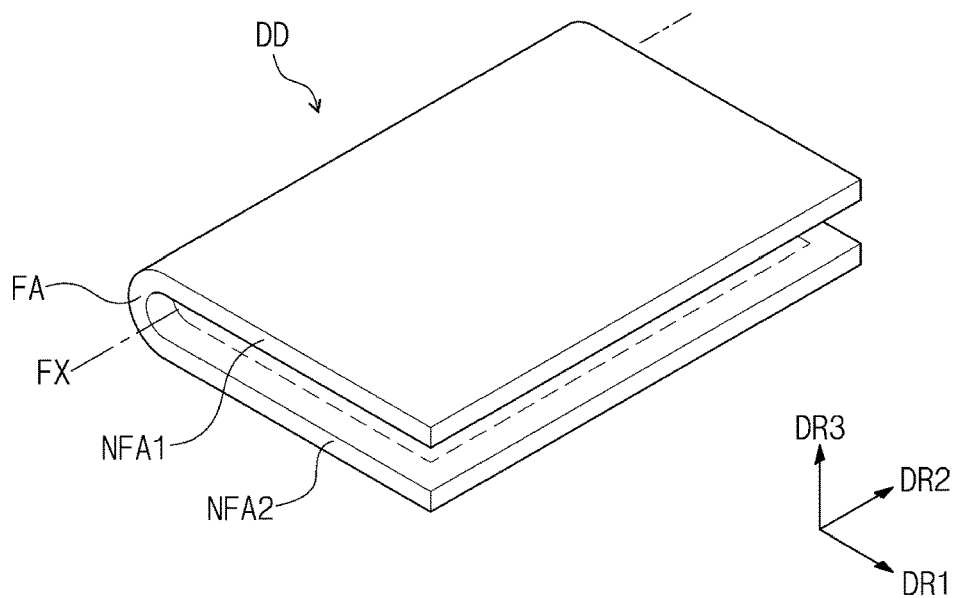
FIG. 2 illustrates a perspective view showing an embodiment of the display device depicted in FIG. 1, which is folded.

FIG. 1 illustrates a perspective view showing an embodiment of a display device DD. FIG. 2 illustrates a perspective view of the display device DD depicted in FIG. 1, which is folded.

Referring to FIG. 1, a display device DD may have a rectangular shape defined by long sides that extend along a first direction DR1 and short sides that extend along a second direction DR2 which intersects the first direction DR1. The display device DD is not limited thereto, and may have various planar shapes such as a circular shape or a polygonal shape. The display device DD may be flexible. Various components of the display device DD may be bendable, foldable, unfoldable, etc. together with each other in bending, folding and/or unfolding of the display device DD.

A third direction DR3 is defined herein as a direction that substantially intersects a plane defined by the first and second directions DR1 and DR2. In this description, the phrase "when viewed in plan" or "in a plan view" may mean that "when viewed along the third direction DR3." A thickness of the display device DD and various components thereof is defined along the third direction DR3 (e.g., a thickness direction of the display device DD).

The display device DD may include a first non-folding area NFA1, a second non-folding area NFA2, and a folding area FA disposed between the first non-folding area NFA1 and the second non-folding area NFA2. The first non-folding area NFA1, the folding area FA and the second non-folding area NFA2 may be arranged in order along the first direction DR1. Various components of the display device DD may include a first non-folding area NFA1, a second non-folding area NFA2 and a folding area FA corresponding to those described for the display device DD.

Although one of the folding area FA and two non-folding areas are exemplarily illustrated, limitations are not imposed on the number of the folding area FA and the number of the non-folding areas. In an embodiment, for example, the display device DD may include more than two non-folding areas and a plurality of folding areas respectively disposed between the more than two non-folding areas.

The display device DD may have or define a top surface which is furthest in the third direction DR3, which is defined as a display surface DS and is in a plane parallel to a plane defined by the first and second directions DR1 and DR2 which cross each other. The display surface DS may provide an image IM generated from the display device DD, to outside the display device DD.

The display surface DS may include a display area DA and a non-display area NDA which is adjacent to the display area DA. The display area DA may display the image IM, and the non-display area NDA may not display the image IM. In a plan view, the non-display area NDA may surround the display area DA. The non-display area NDA may define an edge of the display device DD and may have a color such as by a printed color material. Each of the first non-folding area NFA1, the folding area FA and the second non-folding area NFA2 may include portions in both the display area DA and the non-display area NDA, without being limited thereto. That is, the display area DA may correspond to each of the first non-folding area NFA1, the folding area FA and the second non-folding area NFA2. Similarly, the non-display area NDA may correspond to each of the first non-folding area NFA1, the folding area FA and the second non-folding area NFA2.

Referring to FIG. 2, the display device DD may be foldable and/or unfoldable. In an embodiment, for example, the display device DD and components thereof may be bendable at the folding area FA with respect to a folding axis FX parallel to the second direction DR2. The folding axis FX may be defined as a minor axis parallel to the short side of the display device DD.

Referring to FIG. 2, the display device DD which is folded about the folding axis FX may dispose portions of the display surface DS at the first and second non-folding areas NFA1 and NFA2 facing each other. Therefore, the display device DD may be folded inwardly (e.g., in-foldable) to avoid exposure of the display surface DS to outside the display device DD.

FIG. 2 illustrates the display device DD is folded about the folding axis FX that extends along the second direction DR2, but is not limited thereto. The display device DD may be foldable in different manners. In an embodiment, for example, the display device DD may be foldable about a folding axis FX that extends along the first direction DR1.

Figure 3:
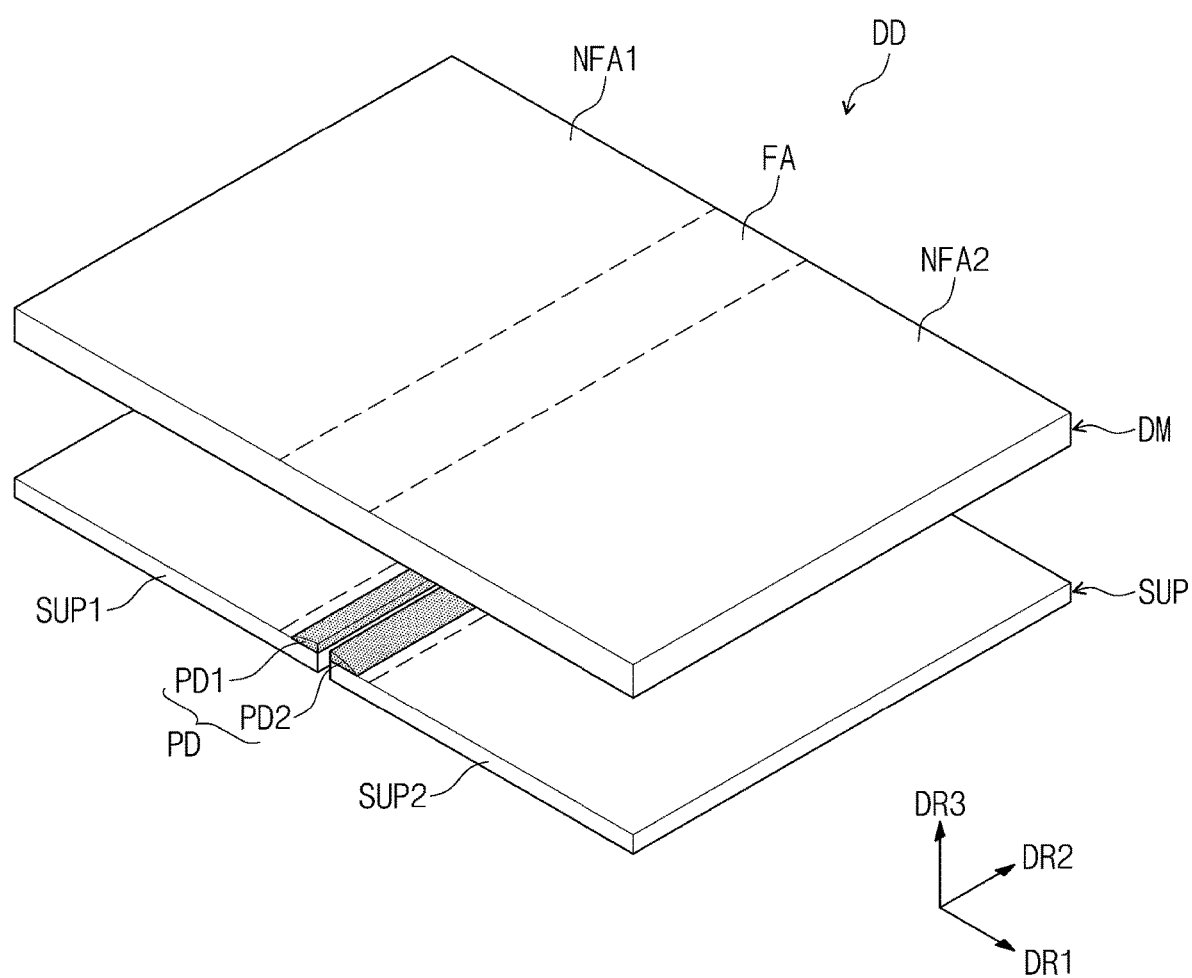
FIG. 3 illustrates an exploded perspective view showing an embodiment of a display device.

FIG. 3 illustrates an exploded perspective view showing an embodiment of a display device DD.

Referring to FIG. 3, the display device DD may include a display module DM, a supporter SUP (e.g., supporter layer or supporting layer) and a pad PD (e.g., pad layer).

The display module DM which is flat or unfolded may have a rectangular shape defined by long sides that extend along the first direction DR1 and short sides that extend along the second direction DR2. The display module DM may include a first non-folding area NFA1, a second non-folding area NFA2 and a folding area FA which is disposed between the first non-folding area NFA1 and the second non-folding area NFA2. The first non-folding area NFA1, folding area FA and the second non-folding area NFA2 may be arranged in order along first direction DR1.

The display module DM may be flexible. In an embodiment, for example, the display module DM and components thereof may be foldable at the folding area FA with respect to the folding axis FX. The display module DM may include a plurality of layers. In an embodiment, for example, the display module DM may include a display panel DP, an input sensing part ISP (e.g., input sensing layer) disposed on the display panel DP, a window WIN disposed on the input sensing part ISP, and a cushion layer CSL disposed below the display panel DP. The display module DM will be further discussed in detail below.

The supporter SUP may be disposed below the display module DM. The supporter SUP may have stiffness sufficient enough to support the display module DM thereon. In an embodiment, for example, the supporter SUP may include a metallic material, and may be inflexible, resistant to bending, etc. as having stiffness.

In an embodiment, for example, the supporter SUP may include a plurality of supporters including a first supporter SUP1 and a second supporter SUP2. The first and second supporters SUP1 and SUP2 may each be a rigid substrate (e.g., inflexible, resistant to bending, etc.). The first supporter SUP1 may be disposed below or corresponding to the first non-folding area NFA1 and a portion of the folding area FA which is closest to the first non-folding area NFA1. The second supporter SUP2 may be disposed below or corresponding to the second non-folding area NFA2 and a portion of the folding area FA which is closest to the second non-folding area NFA2. In a plan view, the first and second supporters SUP1 and SUP2 may have planar shapes as a rectangular shape, but are not limited thereto.

The second supporter SUP2 may be spaced apart along the first direction DR1 from the first supporter SUP1. That is, the display device DD which is flat or unfolded disposes the first supporter SUP1 and the second supporter SUP2 spaced apart from each other (e.g., disconnected from each other). The first supporter SUP1 and the second supporter SUP2 spaced apart from each other may be coplanar with each other within the display device DD which is flat or unfolded. An interval may be provided between the first supporter SUP1 and the second supporter SUP2 which are spaced apart from each other. That is, the display device DD which is flat or unfolded defines an interval between the first supporter SUP1 and the second supporter SUP2 spaced apart from each other.

The supporter SUP may be attached to a bottom surface of the display module DM which is furthest in a direction opposite to the third direction DR3. A fixing member such as an adhesive may be disposed between the supporter SUP and the display module DM. In an embodiment, for example, the adhesive may be a pressure sensitive adhesive. However, the adhesive is not limited thereto. The adhesive may be between the first supporter SUP1 and the first non-folding area NFA1 of the display module DM and between the second supporter SUP2 and the second non-folding area NFA2 of the display module DM.

The pad PD may be disposed within or below the display module DM. That is, the pad PD may be outside of the supporter SUP. The pad PD may overlap or correspond to the folding area FA. In an embodiment, for example, as shown in FIG. 3, the pad PD may be outside of the display module DM and fixed to the supporter SUP, however, is not limited thereto. The pad PD may be fixed to the bottom surface of the display module DM. Although not shown, a member or layer may further be disposed between the supporter SUP and the display module DM. In this case, the pad PD may be disposed on the member or layer to face the supporter SUP with the member or layer therebetween.

The pad PD may include a plurality of pads including a first pad PD1 and a second pad PD2. The first pad PD1 may extend along a direction (e.g., the second direction DR2) parallel to the folding axis FX. Along the second direction DR2, an extending length of the first pad PD1 may be less than a length of the display module DM and greater than a length of the display area DA. The first supporter SUP1 may have or define a top surface which is closest to the display module DM. The first pad PD1 is provided on a portion of the top surface of the first supporter SUP1 which overlaps or corresponds to the folding area FA. The first pad PD1 and the second pad PD2 may be coplanar with each other within the display device DD which is flat or unfolded.

The second pad PD2 may be spaced apart along the first direction DR1 from the first pad PD1. The second supporter SUP2 may have a top surface which is closest to the display module DM. The second pad PD2 is provided at a portion of the top surface of the second supporter SUP2 which overlaps or corresponds to the folding area FA. The second pad PD2 may extend along a direction (e.g., the second direction DR2) parallel to the folding axis FX. Along the second direction DR2, an extending length of the second pad PD2 may be less than the length of the display module DM and greater than the length of the display area DA.

The pad PD may include a synthetic resin material. In an embodiment, for example, the pad PD may be provided or formed by coating a resin material on the supporter SUP. As another embodiment, for example, the pad PD may be provided or formed by stacking a plurality of films on the supporter SUP. The pad PD, however, is not limited to a material or structure.

Figure 4:
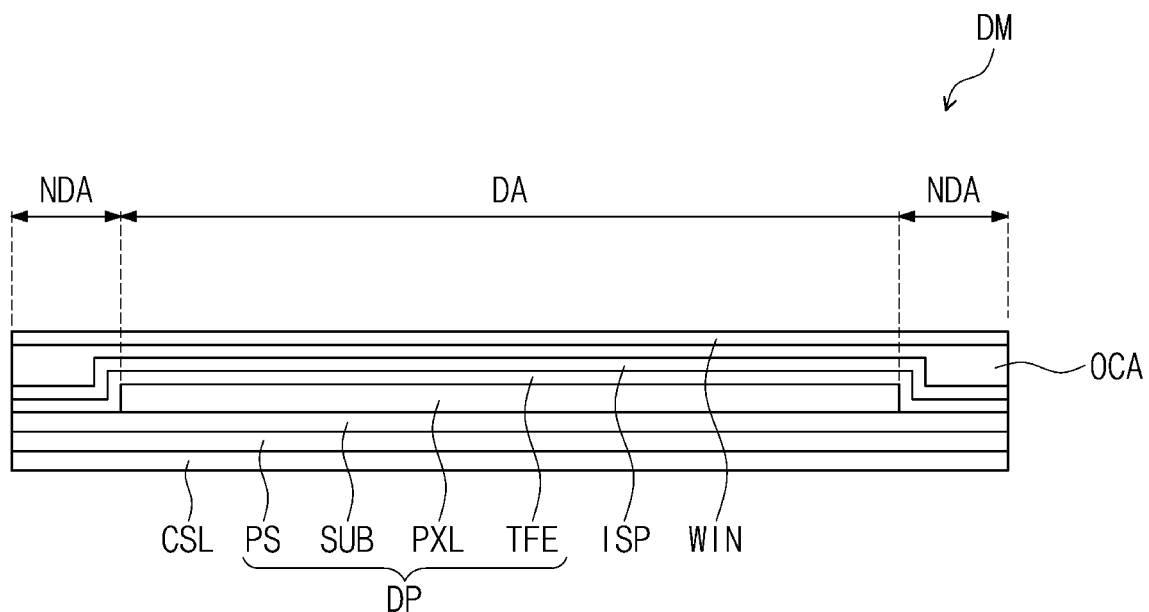
FIG. 4 illustrates a simplified cross-sectional view showing an embodiment of a display module of FIG. 3.

FIG. 4 illustrates a simplified cross-sectional view showing an embodiment of a display module DM of FIG. 3.

Referring to FIG. 4, the display module DM may include a display panel DP, an input sensing part ISP disposed on the display panel DP, a window WIN disposed on the input sensing part ISP, a fixing member such as an adhesive OCA disposed between the input sensing part ISP and the window WIN, and a cushion layer CSL disposed below the display panel DP.

The display panel DP may be emissive (e.g., self-emissive or light-generating), but is not limited thereto. In an embodiment, for example, the display panel DP may be an organic light emitting display panel or a quantum-dot light emitting display panel. An emission layer of the organic light emitting display panel may include an organic light emitting material. An emission layer of the quantum-dot light emitting display panel may include a quantum-dot or a quantum-rod. The following will describe an example in which the display panel DP is an organic light emitting display panel.

The display panel DP may include a substrate SUB (e.g., base substrate or first substrate), a pixel layer PXL (e.g., an display element layer or image display layer) disposed on the substrate SUB, a thin-film encapsulation layer TFE (e.g., encapsulation layer) disposed on the substrate SUB so as to cover the pixel layer PXL, and a protective substrate PS (e.g., second substrate) disposed below the substrate SUB.

The substrate SUB may include a transparent flexible plastic substrate. In an embodiment, for example, the substrate SUB may include polyimide ("PI"). Similar to the display surface DS of the display device DD, the substrate SUB may include a display area DA and a non-display area NDA which is adjacent to the display area DA.

The pixel layer PXL may be disposed in the display area DA. The pixel layer PXL may include a pixel PX provided in plural including a plurality of pixels PX. Each pixel PX may include a light emitting element which generates and/or emits light. A structure of the pixel PX will be further discussed in detail below.

The thin-film encapsulation layer TFE may include at least two inorganic layers and an organic layer that is disposed between the inorganic layers. The inorganic layers may include an inorganic material and may protect the pixel layer PXL against moisture and/or oxygen. The organic layer may include an organic material and may protect the pixel layer PXL against foreign substances such as dust particles.

The protective substrate PS may be disposed below and attached to the substrate SUB. That is, the protective substrate PS may face the pixel layer PXL with the substrate SUB therebetween. A pressure sensitive adhesive (not shown) may be used to attach the protective substrate PS to the substrate SUB, without being limited thereto. The protective substrate PS may protect a lower portion of the display panel DP. The lower portion of the display panel DP may be defined by the substrate SUB. The protective substrate PS may include a flexible plastic substrate. In an embodiment, for example, the protective substrate PS may include polyethylene terephthalate ("PET").

The input sensing part ISP may detect an external input such as from an input tool (e.g., user's hand or touch pen), and may convert the external input into an input signal and provide the display panel DP with the input signal. The input sensing part ISP may include a plurality of sensors (not shown) that detect the external input. The sensors may use a capacitive method to detect the external input. The display panel DP may receive the input signal from the input sensing part ISP and may then generate an image IM that corresponds to the input signal.

The window WIN may protect the display panel DP and the input sensing part ISP against external scratches and impact. The window WIN may be attached through the adhesive OCA, to the input sensing part ISP. The adhesive OCA may include an optically clear adhesive. An image IM generated from the display panel DP may pass through the window WIN and to be visible from outside the display module DM and/or the display device DD.

The cushion layer CSL may be attached to a lower portion of the display module DM. In an embodiment, for example, the cushion layer CSL may be disposed below the protective substrate PS and may be attached such as through an adhesive to a lower portion of the protective substrate PS. That is, the cushion layer CSL may face the input sensing part ISP with the display panel DP therebetween. The cushion layer CSL may absorb external impact that acts on the display panel DP. In an embodiment, for example, the cushion layer CSL may include a resilient foam sheet, where resilient indicates having high yield strengths, low moduli of elasticity, absorbing energy when deformed elastically, releasing that energy upon unloading, etc. A pressure sensitive adhesive may be used to attach the cushion layer CSL to the protective substrate PS, without being limited thereto.

Although not shown, the display module DM may further include an antireflection layer between the window WIN and the input sensing part ISP. The antireflection layer may reduce a reflectance of light that is externally incident from outside the display device DD. In an embodiment, for example, the antireflection layer may include one or more of a retarder and a polarizer.

Figure 5:
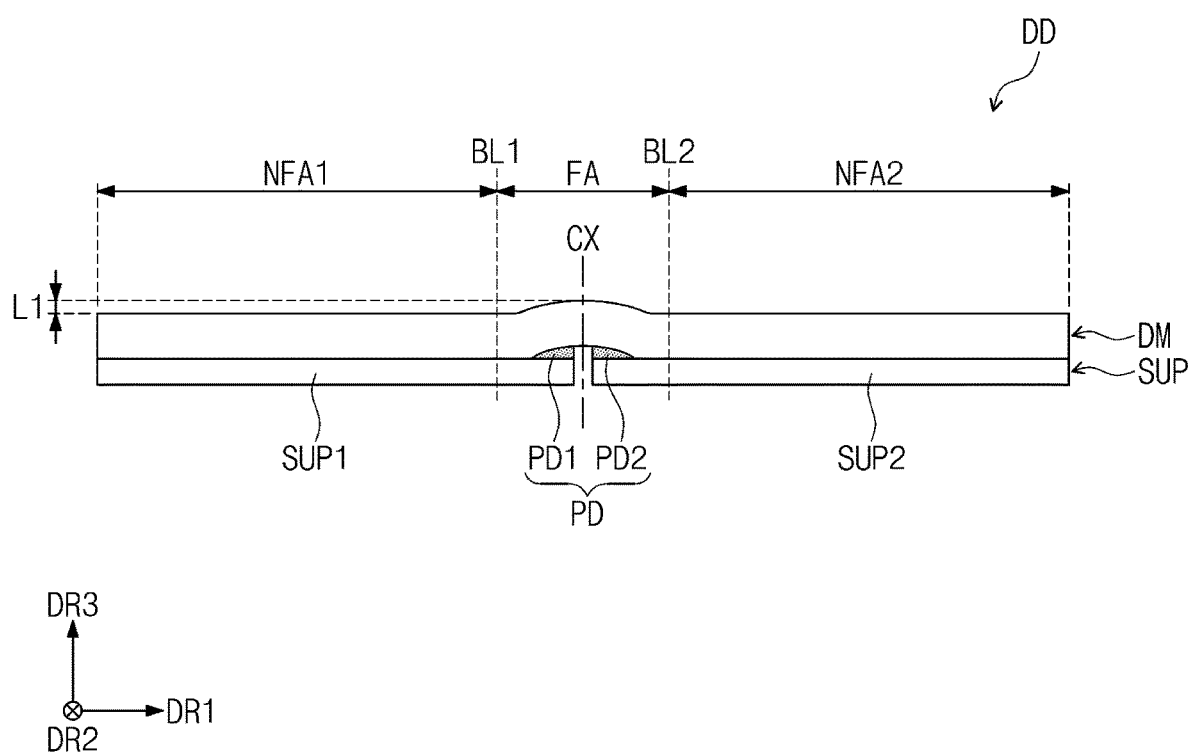
FIG. 5 illustrates a side view showing an embodiment of the display device of FIG. 3.

FIG. 5 illustrates a side view showing an embodiment of the display device DD of FIG. 3 which is viewed along a second direction DR2.

Referring to FIG. 5, the pad PD may be disposed between the display module DM and the supporter SUP. The pad PD may overlap or correspond to the folding area FA. The pad PD may only be in the folding area FA, but is not limited thereto. The first pad PD1 and the second pad PD2 may each have a top surface which faces the display module DM and a bottom surface which faces the supporter SUP. The display module DM may have a bottom surface which faces the pad PD and a top surface which is opposite to the bottom surface of the display module DM. The first supporter SUP1 and the second supporter SUP2 may each have a top surface which faces the display module DM and/or the pad PD, and a bottom surface which is opposite to the top surface of the supporter SUP.

Both of the top surfaces of the first pad PD1 and the second pad PD2 may be in contact with the bottom surface of the display module DM at the folding area FA thereof. The first pad PD1 may have the bottom surface thereof in contact with the top surface of the first supporter SUP1, and the second pad PD2 may have the bottom surface thereof in contact with the top surface of the second supporter SUP2. As being in contact, members or layers may form an interface therebetween, without being limited thereto. Members or layers in contact with each other may be detachable from each other, without being limited thereto.

A height (or thickness) of the pad PD may decrease in each of respective directions away from the central axis CX, and toward a first boundary BL1 or a second boundary BL2. The height of the pad PD may decrease along the first direction DR1, as a distance from the central axis CX increases. Unless otherwise defined in this disclosure, the language "height" may denote a level or vertical position, such as taken with respect to a reference, for example, the top surface of the supporter SUP, a plane, etc. In an embodiment, for example, the height of the pad PD may be a distance along the third direction DR3, which is defined between the top surface of the pad PD, and a corresponding location along the top surface of the supporter SUP, without being limited thereto.

The display device DD may include the central axis CX defined to indicate an imaginary line that extends along the third direction DR3 and the second direction DR2, at a center of the folding area FA which is defined along the first direction DR1. The first boundary BL1 may be defined to indicate an imaginary line that extends along the third direction DR3 and the second direction DR2, at a boundary between the folding area FA and the first non-folding area NFA1 which is defined along the first direction DR1. The second boundary BL2 may be defined to indicate an imaginary line that extends along the third direction DR3 and the second direction DR2, at a boundary between the folding area FA and the second non-folding area NFA2 which is defined along the first direction DR1.

In an embodiment, for example, the height of the first pad PD1 may decrease in a direction from the central axis CX toward the first boundary BL1. The height of the second pad PD2 may decrease in a direction from the central axis CX toward the second boundary BL2.

The bottom surface of each of the first and second pads PD1 and PD2 may be a flat surface parallel to the top surface of the supporter SUP. The top surface of each of the first and second pads PD1 and PD2 may be a curved surface. In an embodiment, for example, the top surfaces of the first and second pads PD1 and PD2 may have convex shapes in the third direction DR3, that is, in a direction away from the supporter SUP.

However, the shapes of the first and second pads PD1 and PD2 are not limited thereto. In an embodiment, for example, in a view along the second direction DR2, the top surfaces of the first and second pads PD1 and PD2 may each have a flat or linear shape that is inclined at an angle relative to the top surface of the supporter SUP. In another embodiment, for example, in a view along the second direction DR2, each of the first and second pads PD1 and PD2 may have a stepwise structure in cross-section. The first and second pads PD1 and PD2 may each have a width along the first direction DR1, and widths of the first and second pads PD1 and PD2 may stepwise decrease in a direction away from the supporter SUP.

The display module DM which is flat or unfolded may have a shape that is deformed by the heights of the first pad PD1 and the second pad PD2 relative to the supporter SUP. In an embodiment, for example, the pad PD may cause the top surface of the display module DM at the folding area FA thereof to be upwardly protruded further than top surfaces of the display module DM at the first and second non-folding areas NFA1 and NFA2 thereof, such as relative to a common reference (e.g., the top surface of the supporter SUP, a plane defined by the first and second directions, etc.). The top surface of the display module DM at the folding area FA may have a convex shape which protrudes in an upward direction (e.g., in the third direction DR3).

A portion of the bottom surface of the display module DM which is closest to the supporter SUP, may correspond to or define a reference plane from which a height of the top surface of the display module DM is taken. Alternatively, a portion of the top surface of the supporter SUP which is closest to the display module DM, may correspond to or define a reference plane from which a height of the top surface of the display module DM is taken. Referring to FIG. 5, along the third direction DR3, a height of the top surface of the folding area FA of the display module DM may be highest or maximum at the central axis CX. The height of the top surface of the folding area FA of the display module DM may decrease along a direction from the central axis CX, and respectively toward the first boundary BL1 or the second boundary BL2.

Along the third direction DR3, a first length L1 (e.g., first height) may be given as a difference in height between the highest and lowest points of the top surface of the display module DM. In an embodiment, for example, the first length L1 may be a difference in the height between the top surface of the folding area FA of the display module DM at the central axis CX, and the height of the top surfaces of the first and second non-folding areas NFA1 and NFA2 of the display module DM. The height of the display module DM at the central axis CX may be a maximum height of the display module DM. That is, a height of the top surface of the display module DM may be maximum at one location, before repeated folding and unfolding.

When the first length L1 is within a range, the top surface having the convex shape which protrudes in the third direction DR3 at the folding area FA may be externally invisible. In an embodiment, for example, when the folding area FA has a width of about 7.5 millimeters (mm) along the first direction DR1, the first length L1 may be equal to or less than about 10 micrometers (μm).

The first length L1, however, is not limited to the above-described range. In an embodiment, for example, the first length L1 may depend on one or more of a width along the first direction DR1 of the display device DD and/or a thickness along the third direction DR3 of the display device DD.

For convenience of description, the following will discuss an example in which, when the folding area FA has a width of about 7.5 mm along the first direction DR1 and when a value of about 10 μm or less is defined as a difference in height between highest and lowest points of the top surface of the display module DM (e.g., first length L1), the difference in height of the top surface of the display module DM is not externally visible (e.g., not visible from outside the display device DD).

Figure 6:
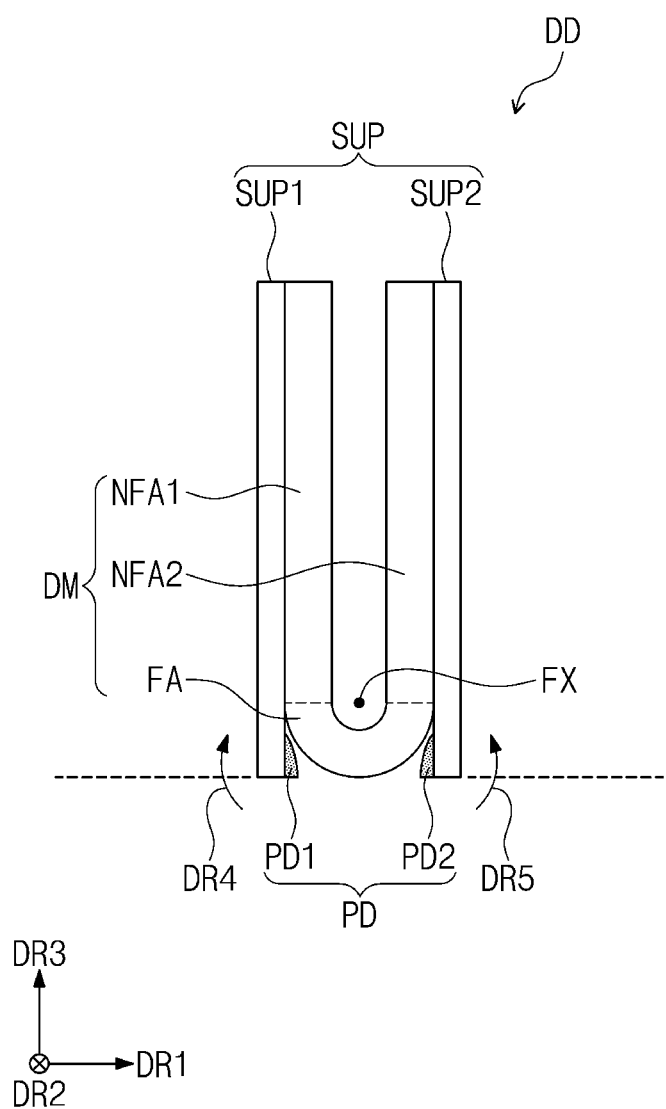
FIG. 6 illustrates a cross-sectional view showing an embodiment of the display device depicted in FIG. 5, which is folded.

FIG. 6 illustrates a cross-sectional view showing the display device DD depicted in FIG. 5 which is folded.

Referring to FIG. 6, the display device DD may be foldable about the folding axis FX. In an embodiment, for example, the first non-folding area NFA1 of the display module DM may rotate in a fourth direction DR4 (e.g., first rotation direction) with reference to the folding axis FX, and the second non-folding area NFA2 of the display module DM may rotate in a fifth direction DR5 (e.g., second rotation direction) with reference to the folding axis FX. In a view along the second direction DR2, the fourth direction DR4 may be defined to denote a clockwise direction relative to the folding axis FX, and the fifth direction DR5 may be defined to denote a counterclockwise direction.

The folding of the display module DM may dispose the first and second non-folding areas NFA1 and NFA2 of the display module DM parallel to the third direction DR3. The display device DD which is folded, disposes the first non-folding area NFA1 spaced apart along the first direction DR1 from the second non-folding area NFA2. The first and second non-folding areas NFA1 and NFA2 may face each other along the first direction DR1, in the display device DD which is folded. The first and second supporters SUP1 and SUP2 may be disposed facing each other along the first direction DR1, with both the first and second non-folding areas NFA1 and NFA2 of the display module DM therebetween.

The folding area FA which is between the first and second non-folding areas NFA1 and NFA2 along a length of the display device DD, may become convexly bent downward, relative to the folding axis FX. In an embodiment, for example, the top surface of the folding area FA of the display module DM may be deformed into a concave shape in a downward direction, and the bottom surface of the folding area FA of the display module DM may be deformed into a convex shape in the downward direction.

The first supporter SUP1 may rotate unitarily or together with the first non-folding area NFA1 of the display module DM. The folding of the display module DM may dispose the first supporter SUP1 parallel to the third direction DR3. The second supporter SUP2 may rotate unitarily or together with the second non-folding area NFA2 of the display module DM. The folding of the display module DM may dispose the second supporter SUP2 parallel to the third direction DR3. The first pad PD1 and the second pad PD2 may rotate together with the first supporter SUP1 and the second supporter SUP2, respectively.

Referring to FIG. 5, a top surface of the pad PD which is closest to the central axis CX may contact or form an interface with a bottom surface of the display module DM. Referring to FIG. 6, the top surface of the pad which was closest to the central axis CX may be separated from the bottom surface of the display module DM. Folding of the display device DD separates the pad PD from the display module DM. That is, the pad PD in contact with the display module DM, may be detachable from the display module DM, by folding of the display device DD.

The display device DD which is folded (FIG. 6) may be unfoldable with respect to the folding axis FX. In an embodiment, for example, rotation of the first non-folding area NFA1 in the fifth direction DR5 and rotation of the second non-folding area NFA2 in the fourth direction DR4, disposes the display device DD unfolded (FIG. 5).

Figure 7:
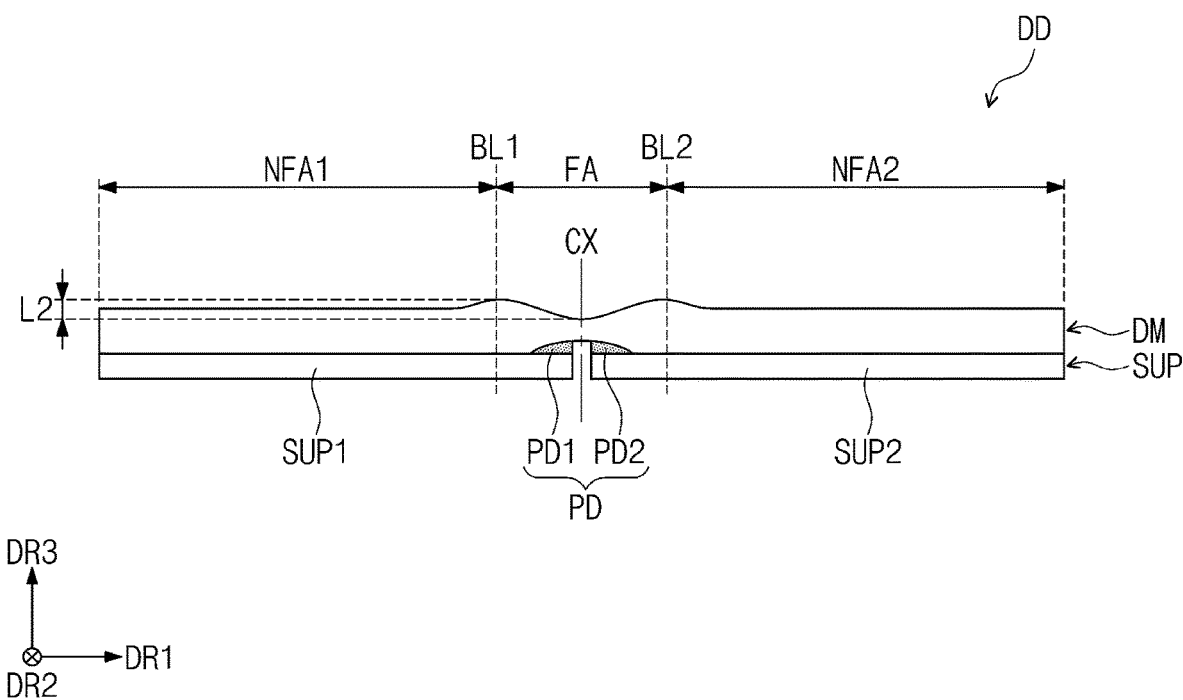
FIG. 7 illustrates a cross-sectional view showing an embodiment of the display device of FIG. 5, after being folded and unfolded a plurality of times.
Figure 8:
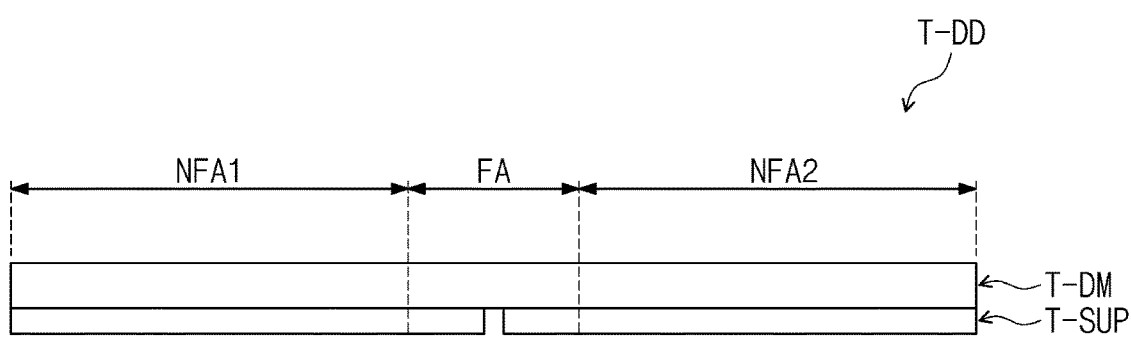
FIGS. 8 to 10 illustrate cross-sectional views showing comparative embodiments of a display module depicted in FIG. 7.
Figure 9:
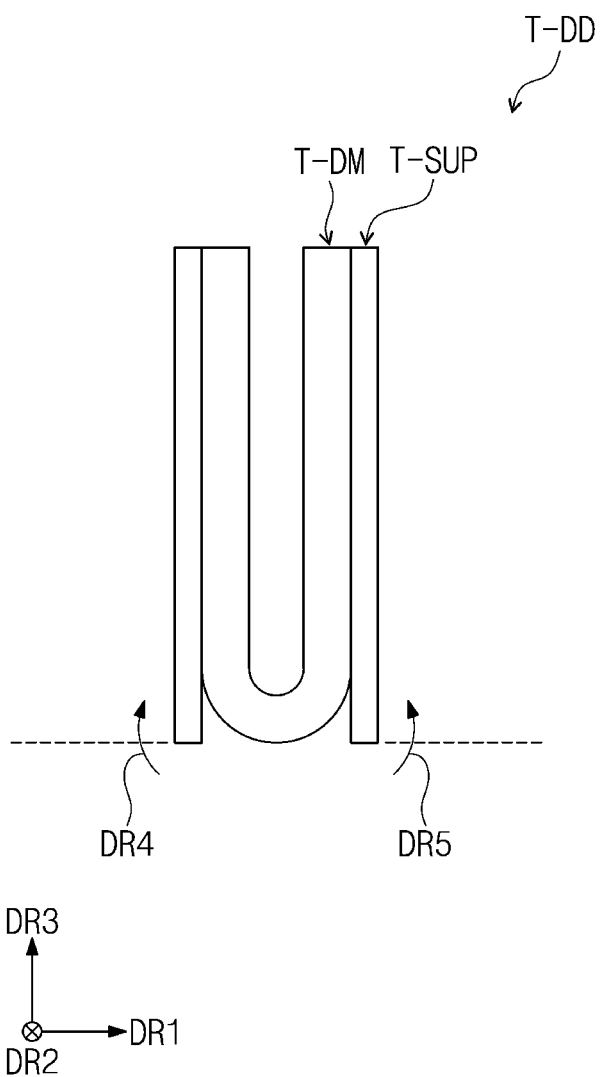
Figure 10:
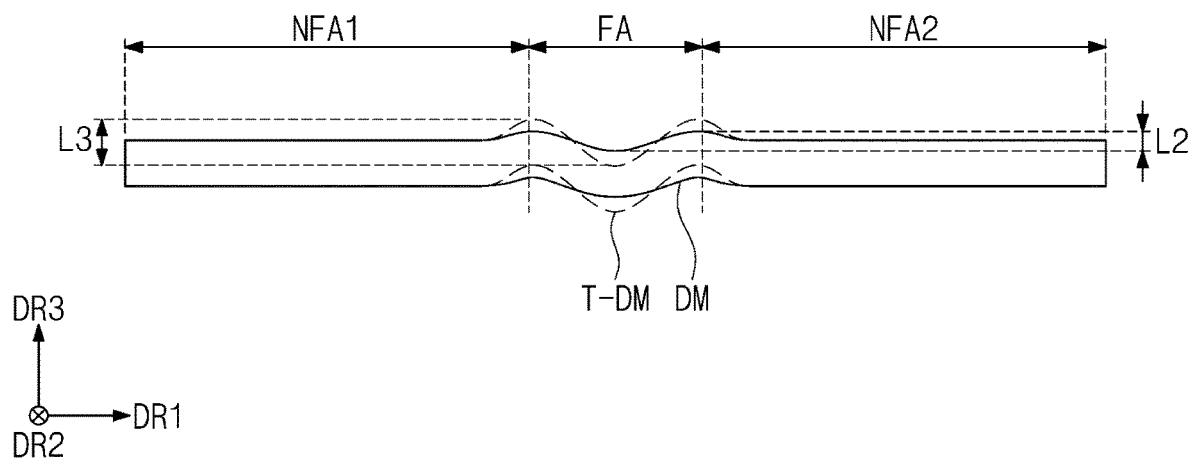

FIG. 7 illustrates a cross-sectional view showing an embodiment of the display device DD of FIG. 5 after being folded and unfolded a plurality of times. FIGS. 8 to 10 illustrate cross-sectional views showing comparative embodiments of a display module DM depicted in FIG. 7. For convenience of description, FIG. 10 omits the illustration of the supporter SUP and the pad PD. In addition, a solid line in FIG. 10 represents one or more embodiment of the display device DD, and a dotted line expresses a test display device T-DD.

Referring to FIG. 7, in a view along the central axis CX (FIG. 5), the top surface of the folding area FA at the central axis CX may be concavely recessed in a downward direction (e.g., in a direction opposite to the third direction DR3). At the first boundary BL1, a portion of the top surface of each of the folding area FA and the first non-folding area NFA1 may protrude in an upward direction (e.g., in the third direction DR3). At the second boundary BL2, a portion of the top surface of each of the folding area FA and the second non-folding area NFA2 may protrude in the upward direction (e.g., in the third direction DR3).

Referring to FIG. 7, a height of the top surface of the display module DM may be smallest at the central axis CX and greatest at the first and/or second boundaries BL1 and BL2. That is, a height of the top surface of the display module DM may be maximum at two locations, within a display device DD which is repeatedly folded and unfolded. The height of the top surface of the display module DM at the central axis CX may be less than the height of the top surface of the display module DM at the first and second boundaries BL1 and BL2, by as much as a second length L2 (e.g., second height). The second length L2 may be defined as a maximum difference in height between the highest and lowest points of the top surface of the display module DM. The second length L2 may be equal to the first length L1 of FIG. 5. In an embodiment, for example, the second length L2 may be equal to or less than about 10 μm. Therefore, the deformed portions of the top surface of the display module DM may not be visible from outside the display device DD.

Referring to FIGS. 8 and 9, the test display device T-DD may include a test display module T-DM and a test supporter T-SUP. The test display module T-DM may be the same as the display module DM of FIG. 5. The test supporter T-SUP may be the same as the supporter SUP of FIG. 5. The test display device T-DD may differ from the display device DD in that the pad PD is not included.

The test display device T-DD may be folded or unfolded. The procedure for folding or unfolding the test display device T-DD may be the same as that described for the display device DD. Therefore, a repetitive description thereof will be omitted.

Referring to FIG. 10, in a view along the central axis CX, a top surface of the test display module T-DM may have a portion whose shape is concavely recessed in a downward direction. At the first and second boundaries BL1 and BL2, the top surface of the test display module T-DM may have a portion with a convex shape that protrudes in an upward direction.

A height of the top surface of the test display module T-DM at the central axis CX may be less than a height of the top surface of the test display module T-DM at the first and second boundaries BL1 and BL2, by as much as a third length L3 (e.g., third height). The third length L3 may be defined as a maximum difference in height between the highest and lowest points of the top surface of the test display module T-DM. The third length L3 may be greater than the second length L2. In an embodiment, for example, the third length L3 may be greater than about 10 μm. Therefore, the deformed portions at the top surface of the test display module T-DM excluding the pad PD may be visible from outside the test display device T-DD.

In embodiments, the pad PD may contact the bottom surface of the folding area FA, such that the top surface of the display module DM may undergo pre-deformation (FIG. 5) which causes the top surface of the folding area FA to protrude upwardly. Therefore, even when the display device DD is repeatedly folded and unfolded a plurality of times (FIG. 7), the pre-deformation may minimize or reduce deformation at the top surface of the display module DM, with the result that the deformation of the display module DM which does occur may be externally invisible. That is, the display device DD which is flat or unfolded, includes the display module DM pre-deformed at the folding area FA, to reduce deformation of the display module DM at the folding area FA which has be repeatedly folded and unfolded. Pre-deformation of the display module DM includes a protruded portion of the display module DM at the folding area FA, owing to the pad PD between the display module DM and the supporter SUP. The protruded portion is defined by a height of the top surface of the display module DM at the folding area FA which is greater than a height of the top surface at remaining portions of the display module DM (e.g., one or more of the non-folding areas).

Figure 11:
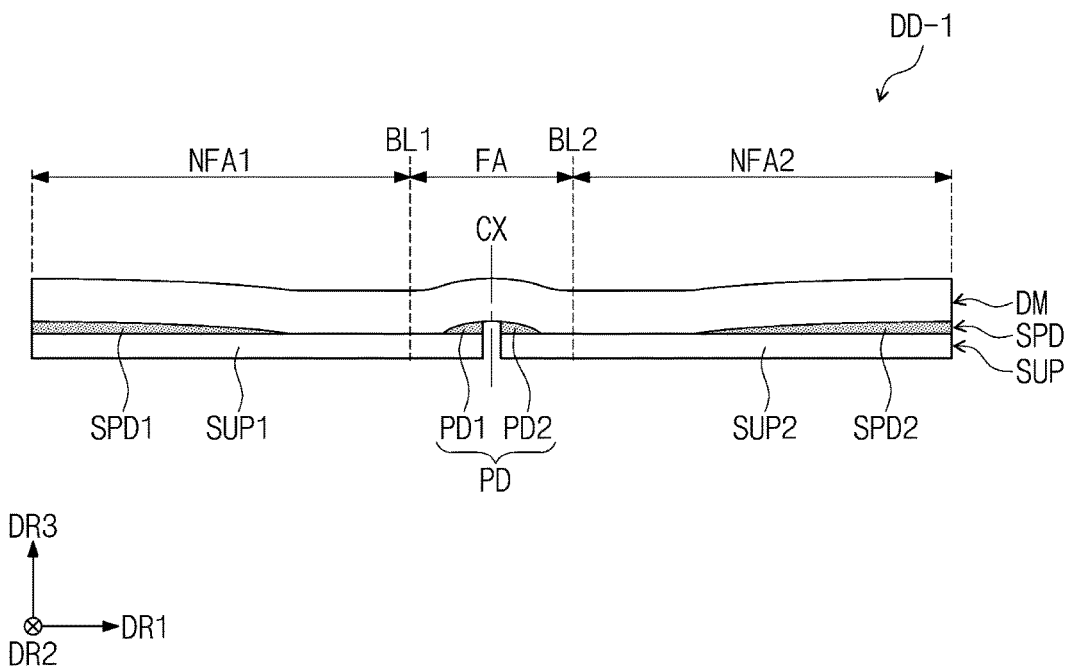
FIGS. 11 to 13 illustrate cross-sectional views showing embodiments of a display device.
Figure 12:
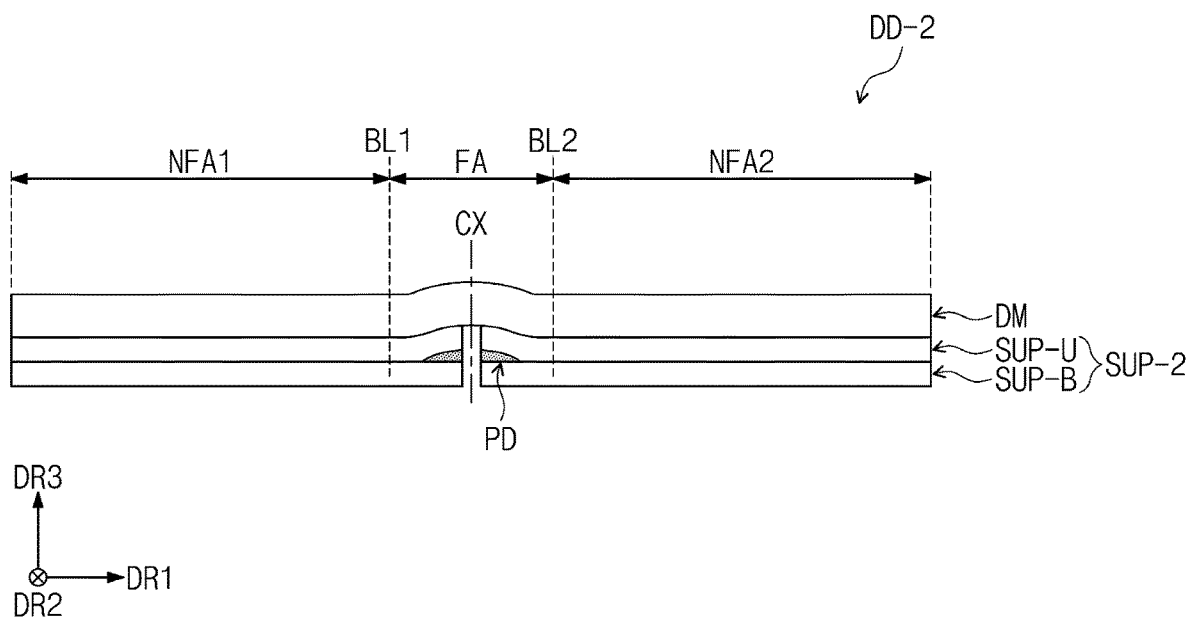
Figure 13:
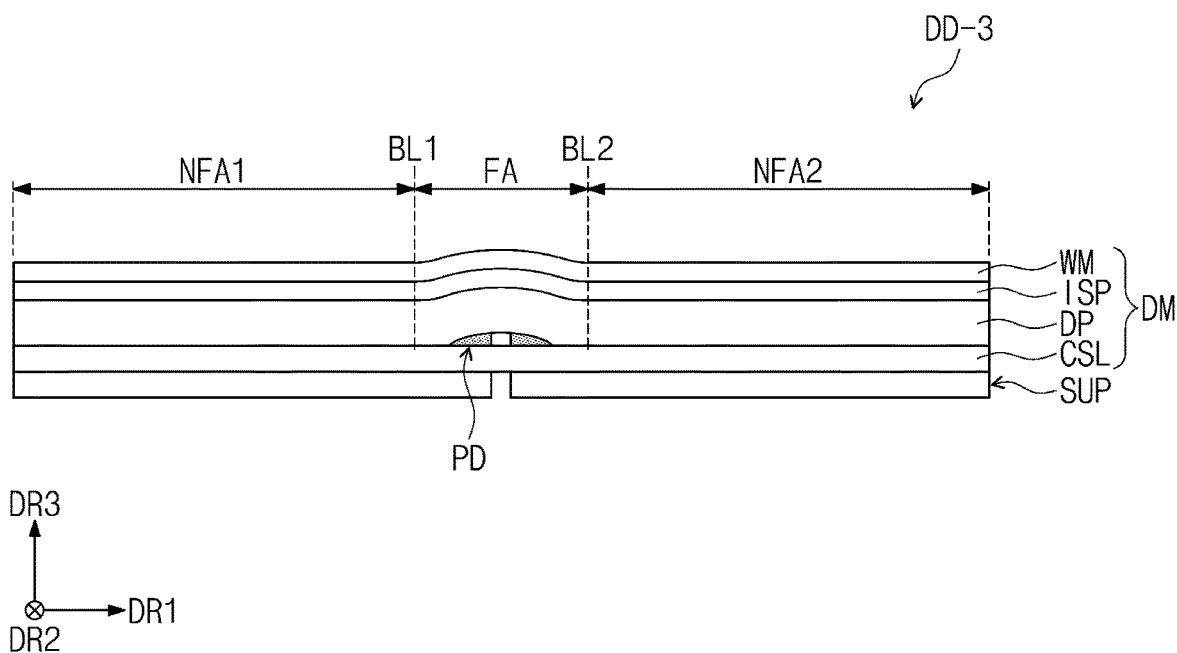

FIGS. 11 to 13 illustrate cross-sectional views showing embodiments of a display device DD. Similar to the display device DD shown in FIG. 2, display device DD-1, display device DD-2 and display device DD-3 respectively illustrated in FIGS. 11 to 13 may be folded inwardly (e.g., in-folded or be in-foldable).

The following will focus on descriptions of different components from those of the embodiments mentioned above, and explanations of the same components will be omitted.

Referring to FIG. 11, the display device DD-1 may further include a subsidiary pad SPD (e.g., sub-pad). The subsidiary pad SPD may overlap or correspond to the first and second non-folding areas NFA1 and NFA2 of the display module DM. In an embodiment, for example, the subsidiary pad SPD may include a plurality of pads (or a plurality of sub-pads) including a first subsidiary pad SPD1 (e.g., first sub-pad) and a second subsidiary pad SPD2 (e.g., second sub-pad). The first subsidiary pad SPD1 may overlap or correspond to the first non-folding area NFA1. The second subsidiary pad SPD2 may overlap or correspond to the second non-folding area NFA2. The first subsidiary pad SPD1 and the second subsidiary pad SPD2 may be coplanar with each other and with the pad PD, to define the pad layer, within the display device DD-1 which is flat or unfolded.

The first and second subsidiary pads SPD1 and SPD2 may each be disposed between the display module DM and the supporter SUP. The display module DM, the first supporter SUP1 and the second supporter SUP2 may each include opposing ends along the first direction DR1. The first supporter SUP1 and the second supporter SUP2 may each include a first end which is furthest from the central axis CX and a second end which is closest to the central axis CX. In an embodiment, for example, the first subsidiary pad SPD1 may be fixed to a portion of the top surface of the first supporter SUP1 which corresponds to the first non-folding area NFA1. The first subsidiary pad SPD1 may extend toward the central axis CX from the first end of the first supporter SUP1. An inner end of the first subsidiary pad SPD1 which is closest to the central axis CX is spaced apart from the first pad PD1, such that a region of the first supporter SUP1 is exposed from the pad layer. The region may be in both the folding area FA and the first non-folding area NFA1.

The second subsidiary pad SPD2 may be fixed to a portion of the top surface of the second supporter SUP2 which corresponds to the second non-folding area NFA2 of the display module DM. The second subsidiary pad SPD2 may extend toward the central axis CX from the first end of the second supporter SUP2. An inner end of the second subsidiary pad SPD2 which is closest to the central axis CX is spaced apart from the second pad PD2, such that a region of the second supporter SUP2 is exposed from the pad layer. The region may be in both the folding area FA and the second non-folding area NFA2.

The first and second subsidiary pads SPD1 and SPD2 may be fixed to the top surface of the supporter SUP, but are not limited thereto. In an embodiment, for example, the first and second subsidiary pads SPD1 and SPD2 may be fixed to the bottom surface of the display module DM.

The first subsidiary pad SPD1 and the second subsidiary pad SPD2 each includes a top surface which is furthest from the supporter SUP. A height of the top surface of the subsidiary pad SPD may vary along the display module DM and/or the supporter SUP, to define different heights of the pad layer. A height of the top surface of the first subsidiary pad SPD1 may decrease in a direction from the first non-folding area NFA1 toward the central axis CX. A height of the top surface of the second subsidiary pad SPD2 decrease in a direction from the second non-folding area NFA2 toward the central axis CX. The top surface of each of the first and second subsidiary pads SPD1 and SPD2 may be a curved surface or an inclined surface.

Referring to FIG. 12, the pad PD of the display device DD-2 may be disposed within a supporter SUP-2. In an embodiment, for example, the supporter SUP-2 may include a plurality of supporters including an upper supporter SUP-U (e.g., upper supporter layer) and a lower supporter SUP-B (e.g., lower supporter layer). The upper supporter SUP-U may be disposed below the display module DM. The lower supporter SUP-B may be disposed below the upper supporter SUP-U. That is, the lower supporter SUP-B may face the display module DM with the upper supporter SUP-U therebetween. The upper supporter SUP-U may have flexibility.

The upper supporter SUP-U may include a plurality of supporter portions including a first supporter portion which corresponds to the first non-folding area NFA1 and a second supporter portion which corresponds to the second non-folding area NFA2 and is disconnected from the first supporter portion at the folding area FA. The first supporter portion and the second supporter portion may be coplanar with each other within the display device DD-2 which is flat or unfolded. Similarly the lower supporter SUP-B may include a plurality of supporter portions including a third supporter portion which corresponds to the first non-folding area NFA1 and a fourth supporter portion which corresponds to the second non-folding area NFA2 and is disconnected from the third supporter portion at the folding area FA. The third supporter portion and the fourth second supporter portion may be coplanar with each other within the display device DD-2 which is flat or unfolded.

The pad PD may be disposed between the upper and lower supporters SUP-U and SUP-B, while overlapping or corresponding to the folding area FA. In an embodiment, for example, the pad PD may be fixed to a top surface of the lower supporter SUP-B, and in contact with a bottom surface of the upper supporter SUP-U. Alternatively or in addition, the pad PD may be fixed to the bottom surface of the upper supporter SUP-U and in contact with the top surface of the lower supporter SUP-B.

Referring to FIG. 13, the pad PD of the display device DD-3 may be disposed within the display module DM. In an embodiment, for example, the pad PD may be disposed between the cushion layer CSL and the display panel DP of the display module DM. The pad PD may deform shapes of the display panel DP, the input sensing part ISP, and the window WIN that are disposed on the cushion layer CSL. That is, pre-deformation of the display module DM is defined at each of the display panel DP, the input sensing part ISP and the window WIN.

The pad PD is not limited to a position between the display panel DP and the cushion layer CSL. The pad PD may be disposed between the window WIN and the input sensing part ISP or between the display panel DP and the input sensing part ISP. The pad PD may include a transparent material.

Figure 14:
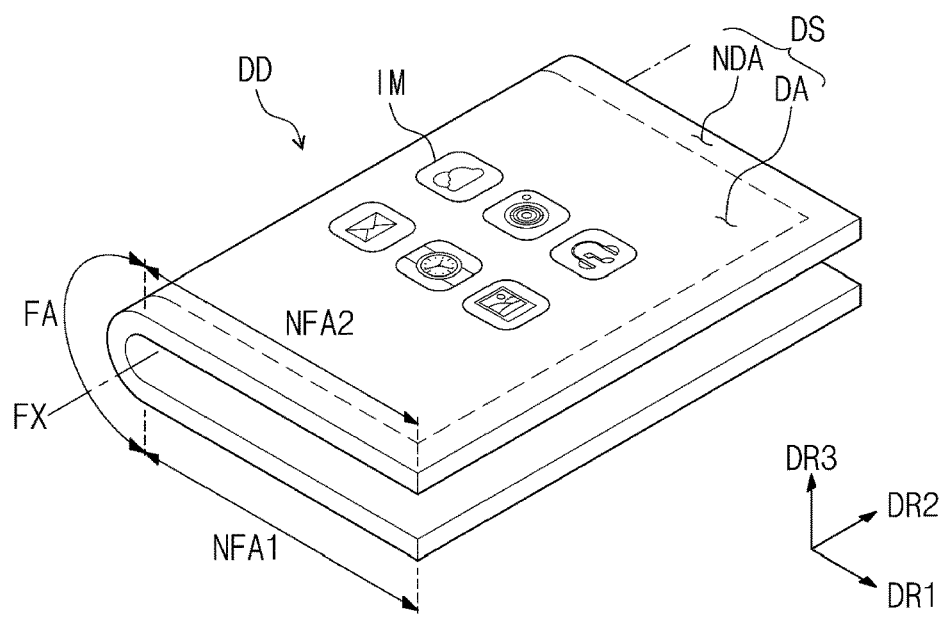
FIG. 14 illustrates a perspective view showing an embodiment of the display device depicted in FIG. 1, which is folded.
Figure 15:
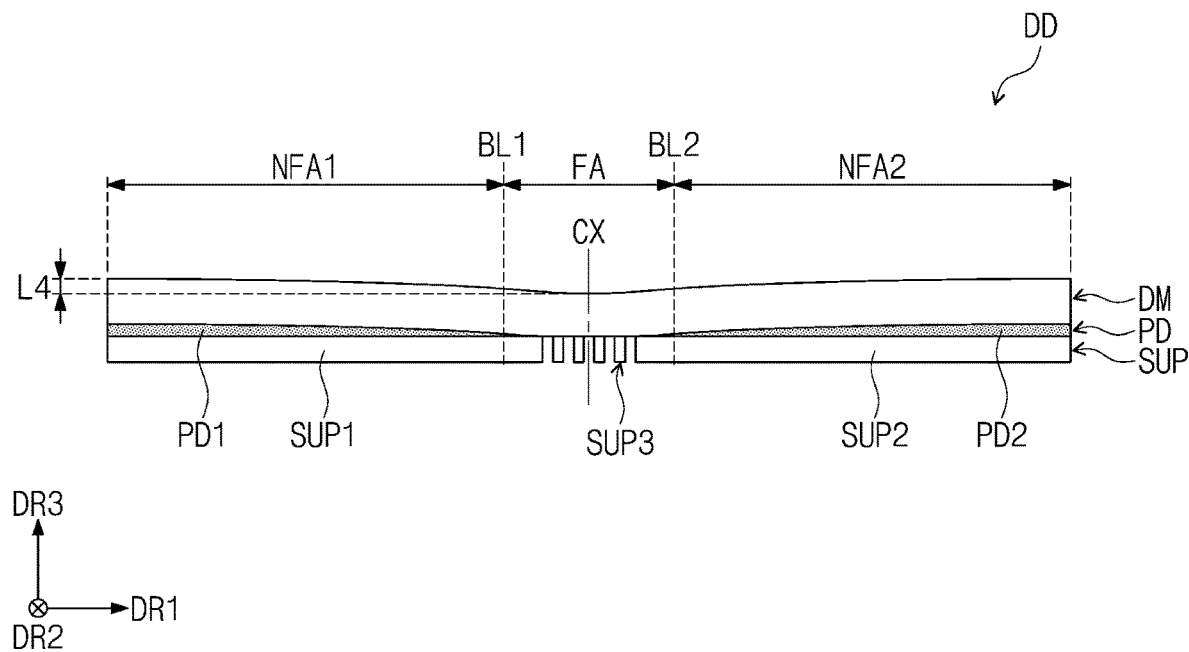
FIG. 15 illustrates a cross-sectional view showing an embodiment of the display device depicted in FIG. 14, which is unfolded.
Figure 16:
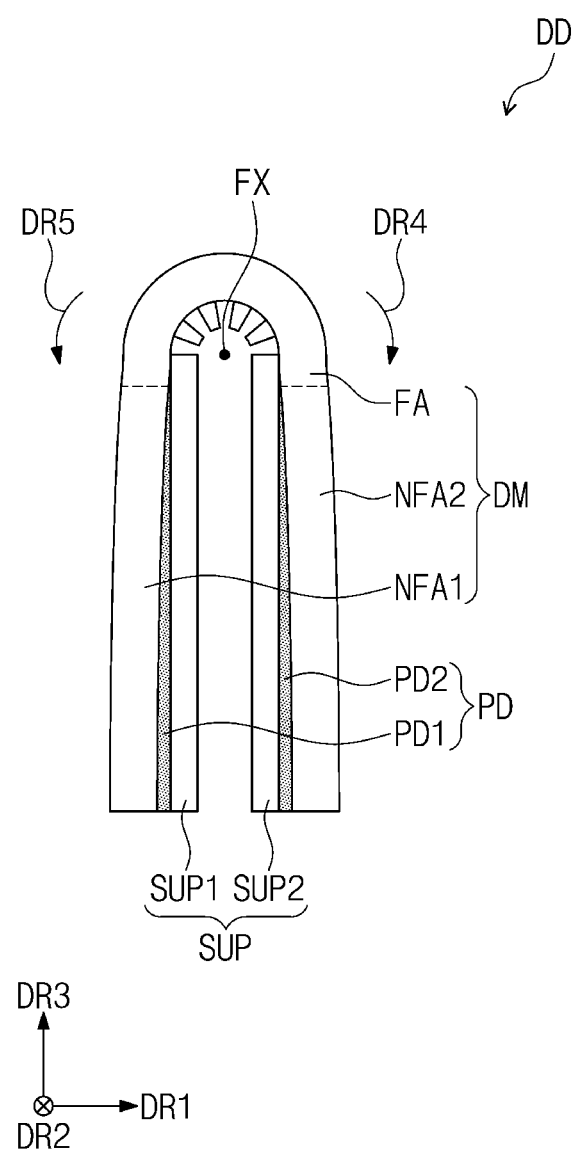
FIG. 16 illustrates a simplified cross-sectional view showing an embodiment of the display device of FIG. 14.

FIG. 14 illustrates a perspective view showing the display device DD depicted in FIG. 1, which is folded. FIG. 15 illustrates a cross-sectional view showing the display device DD depicted in FIG. 14, which is unfolded. FIG. 16 illustrates a simplified cross-sectional view showing the display device DD of FIG. 14. As discussed above each of the first non-folding area NFA1, the folding area FA and the second non-folding area NFA2 may include portions in both the display area DA and the non-display area NDA (see also FIG. 1), without being limited thereto. That is, the display area DA may correspond to each of the first non-folding area NFA1, the folding area FA and the second non-folding area NFA2. Similarly, the non-display area NDA may correspond to each of the first non-folding area NFA1, the folding area FA and the second non-folding area NFA2.

Referring to FIG. 14, the display device DD may be folded outwardly, or out-folded (e.g., out-foldable), to externally expose the display surface DS. That is, the display device DD which is out-folded disposes portions of the display surface DS facing away from each other, e.g., facing outside the display device DD. Therefore, when the display device DD is out-folded, the top surfaces of the first and second non-folding areas NFA1 and NFA2 of the display module DM may be externally exposed.

Referring to FIG. 15, the display device DD may include a display module DM, a supporter SUP and a pad PD. The display module DM may include a first non-folding area NFA1, a folding area FA and a second non-folding area NFA2. The first non-folding area NFA1, the second non-folding area NFA2 and the folding area FA may be arranged along the first direction DR1. The folding area FA may be disposed between the first non-folding area NFA1 and the second non-folding area NFA2 along the first direction DR1.

The supporter SUP may be disposed below and support the display module DM. The supporter SUP may have stiffness. In an embodiment, for example, the supporter SUP may include a metallic material.

The supporter SUP may include a plurality of supporters including a first supporter SUP1, a second supporter SUP2 and a third supporter SUP3. The first supporter SUP1, the second supporter SUP2 and the third supporter SUP3 may include the same material as each other. The first supporter SUP1 may overlap or correspond to the first non-folding area NFA1 and a portion of the folding area FA. The second supporter SUP2 may overlap or correspond to the second non-folding area NFA2 and a portion of the folding area FA. The third supporter SUP3 may overlap or correspond to the folding area FA. In an embodiment, the third supporter SUP3 may overlap or correspond to only the folding area FA. The first supporter SUP1, the second supporter SUP2 and the third supporter SUP3 may be coplanar with each other within the display device DD which is flat or unfolded (FIG. 15).

The third supporter SUP3 may include a plurality of joint units. Each joint unit may be a protrusion of the supporter SUP. The joint units may be spaced apart from each other along the first direction DR1. The first supporter SUP1 and the second supporter SUP2 may each be disconnected from the third supporter SUP3, at the folding area FA. The joint units may be attached to a bottom surface of the display module DM, such as through an adhesive.

The pad PD may be disposed between the display module DM and the supporter SUP. The pad PD may overlap or correspond to the first and second non-folding areas NFA1 and NFA2. In an embodiment, for example, the pad PD may include a plurality of pads including a first pad PD1 and a second pad PD2 which are disconnected from each other at the folding area FA. The first pad PD1 may be disposed on and facing a top surface of the first supporter SUP1. In an embodiment, for example, the first pad PD1 may extend toward a central axis CX from a distal end of the first supporter SUP1 which is furthest from the central axis CX. The second pad PD2 may be disposed on and facing a top surface of the second supporter SUP2. In an embodiment, for example, the second pad PD2 may extend toward the central axis CX from a distal end of the second supporter SUP2 which is furthest from the central axis CX.

The first pad PD1 and/or the second pad PD2 may be disposed in only a non-folding area of the display device DD but is not limited thereto. Referring to FIG. 15, for example, the first pad PD1 and/or the second pad PD2 in a respective non-folding area, may extend from the respective non-folding area and into the folding area FA. That is, the pad PD extends in a direction toward the folding area FA from the non-folding area, to define a portion of the pad PD in the folding area FA. An inner end of the first pad PD1 which is closest to the central axis CX is spaced apart from an inner end of the first supporter SUP1, such that a region of the first supporter SUP1 is exposed from the pad layer, at the folding area FA. An inner end of the second pad PD2 which is closest to the central axis CX is spaced apart from an inner end of the second supporter SUP2, such that a region of the second supporter SUP2 is exposed from the pad layer, at the folding area FA. That is, the supporter SUP extends further than an end of the pad PD, at the folding area FA.

A height of the pad PD may decrease in a respective direction from the first and second non-folding areas NFA1 and NFA2, toward the central axis CX or a center of the folding area FA. In an embodiment, for example, a height of the top surface of the first pad PD1 may decrease in a direction from the first non-folding area NFA1 toward the folding area FA. Similarly, a height of the top surface of the second pad PD2 may decrease in a direction from the second non-folding area NFA2 toward the folding area FA.

The top surfaces of the first and second pads PD1 and PD2 may each be curved. However, the shapes of the top surfaces of the first and second pads PD1 and PD2 are not limited thereto. In an embodiment, for example, the top surfaces of the first and second pads PD1 and PD2 may each have a flat or linear shape that is inclined relative to a top surface of the supporter SUP. In an embodiment, for example, the first and second pads PD1 and PD2 may each have a stepwise structure whose width decreases in the third direction DR3 in cross-section, as discussed above.

The display module DM may have a shape that is deformed by heights of the first pad PD1 and the second pad PD2. In an embodiment, for example, the pad PD may cause a height of the top surface of display module DM which corresponds to the folding area FA to be smaller than a height of the top surface of the display module DM which corresponds to the first and second non-folding areas NFA1 and NFA2. The top surface of the display module DM at the folding area FA may be concave in a downward direction. Along the third direction DR3, a height of the top surface of the display module DM at the folding area FA may be smallest (e.g., minimum) at the central axis CX. The height of the top surface of the display module DM at the folding area FA may decrease in each of respective directions from the central axis CX, toward the first boundary BL1 or the second boundary BL2.

Along the third direction DR3, a fourth length L4 (e.g. fourth height) may be defined as a difference in heights between the highest and the lowest points along the top surface of the display module DM. The fourth length L4 may be the same as the first length L1 of FIG. 5. In an embodiment, for example, the fourth length L4 may be equal to or less than about 10 μm. In conclusion, the concave top surface of the folding area FA may be externally invisible.

Referring to FIG. 16, the display device DD may be folded about the folding axis FX. In an embodiment, for example, the first non-folding area NFA1 of the display module DM may be rotatable along in the fifth direction DR5, and the second non-folding area NFA2 of the display module DM may be rotatable along the fourth direction DR4.

The display module DM which is folded may dispose the first and second non-folding areas NFA1 and NFA2 parallel to the third direction DR3. The display module DM which is folded may dispose the first non-folding area NFA1 spaced apart along the first direction DR1 from the second non-folding area NFA2. Referring to FIG. 16, the first and second non-folding areas NFA1 and NFA2 may face each other and be opposite to each other, with the supporter SUP therebetween.

The display module DM which is folded may dispose the folding area FA convexly bent in an upward direction. The display module DM which is out-folded may be open in a direction opposite to the third direction DR3, whereas the display module DM which is in-folded (FIG. 6) may be open in the third direction DR3. In an embodiment, for example, the top surface of the display module DM and/or the display device DD at the folding area FA may have a convex shape in the upward direction, and the bottom surface of the folding area FA may have a concave shape in the upward direction. The first supporter SUP1 and the first pad PD1 which is disposed on the first supporter SUP1 may rotate together with the first non-folding area NFA1, and the second supporter SUP2 and the second pad PD2 which is disposed on the second supporter SUP2 may rotate together with the second non-folding area NFA2. In an embodiment, the first supporter SUP1, the second supporter SUP2, the first pad PD1 which is disposed on the first supporter SUP1 and the second pad PD2 which is disposed on the second supporter SUP2 may all rotate together with the first and second non-folding areas NFA1 and NFA2 which rotate together, without being limited thereto.

The display device DD which is folded (FIG. 16) may be unfoldable with respect to the folding axis FX. In an embodiment, for example, relative to the structure shown in FIG. 16, rotation of the first non-folding area NFA1 in the fourth direction DR4 and rotation of the second non-folding area NFA2 rotates in the fifth direction DR5, disposes the display device DD unfolded as shown in FIG. 15.

Figure 17:
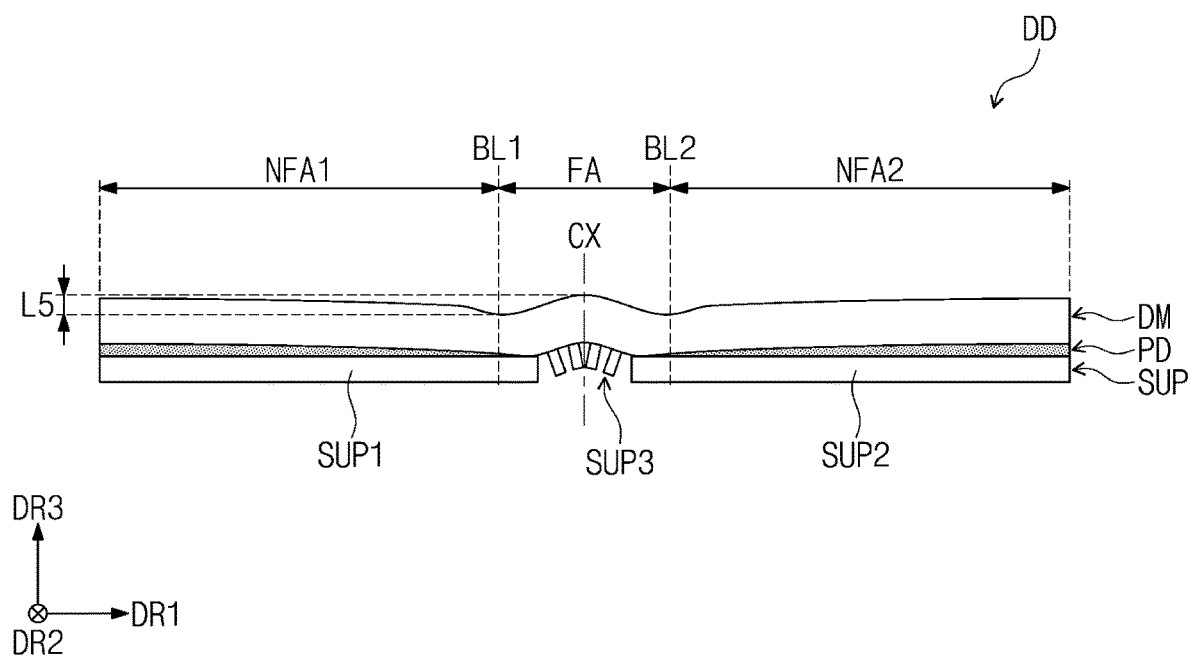
FIG. 17 illustrates a cross-sectional view showing an embodiment of the display device of FIG. 15 after being folded and unfolded a plurality of times.

FIG. 17 illustrates a cross-sectional view showing an embodiment of the display device DD of FIG. 15 after being folded and unfolded a plurality of times.

Referring to FIG. 17, in a view along the central axis CX, a portion of the top surface of the folding area FA may have a convex shape that protrudes in an upward direction (e.g., the third direction DR3). At the first boundary BL1, a portion of the top surface of each of the folding area FA and the first non-folding area NFA1 may together form a concave shape that is recessed in a downward direction (e.g., direction opposite to the third direction DR3). At the second boundary BL2, a portion of the top surface of each of the folding area FA and the second non-folding area NFA2 may together form a concave shape that is recessed in the downward direction (e.g., direction opposite to the third direction DR3).

Referring to FIG. 17, a height of the top surface of the display module DM may be highest at the central axis CX and lowest at the first and second boundaries BL1 and BL2. The height of the top surface of the display module DM at the central axis CX may be greater than the height of the top surface of the display module DM at the first and second boundaries BL1 and BL2, by as much as a fifth length L5. The fifth length L5 may be defined as a maximum difference in heights between the highest and lowest points of the top surface of the display module DM. The fifth length L5 may be the same as the first length L1 of FIG. 5. In an embodiment, for example, the fifth length L5 may be equal to or less than about 10 μm. Therefore, there the deformed portions of the top surface of the display module DM may not be visible from outside the display device DD.

In embodiments, the pad PD may contact the bottom surfaces of the display module DM at the first and second non-folding areas NFA1 and NFA2, such that the top surface of the display module DM may undergo pre-deformation (FIG. 15) which causes the top surface of the folding area FA to recess in the downward direction. Therefore, even when the display device DD is repeatedly folded and unfolded a plurality of times (FIG. 17), the pre-deformation may minimize or reduce deformation at the top surface of the display module DM, with the result that the deformation of the display module DM which does occur may be externally invisible. That is, the display device DD which is flat or unfolded, includes the display module DM pre-deformed at the folding area FA (FIG. 15), to reduce deformation of the display module DM at the folding area FA (FIG. 17) which has be repeatedly folded and unfolded. Pre-deformation of the display module DM includes a recessed portion of the display module DM at the folding area FA, owing to the pad PD between the display module DM and the supporter SUP. The recessed portion is defined by a height of the top surface of the display module DM at the folding area FA which is smaller than a height of the top surface at remaining portions of the display module DM (e.g., one or more of the non-folding areas).

Figure 18:
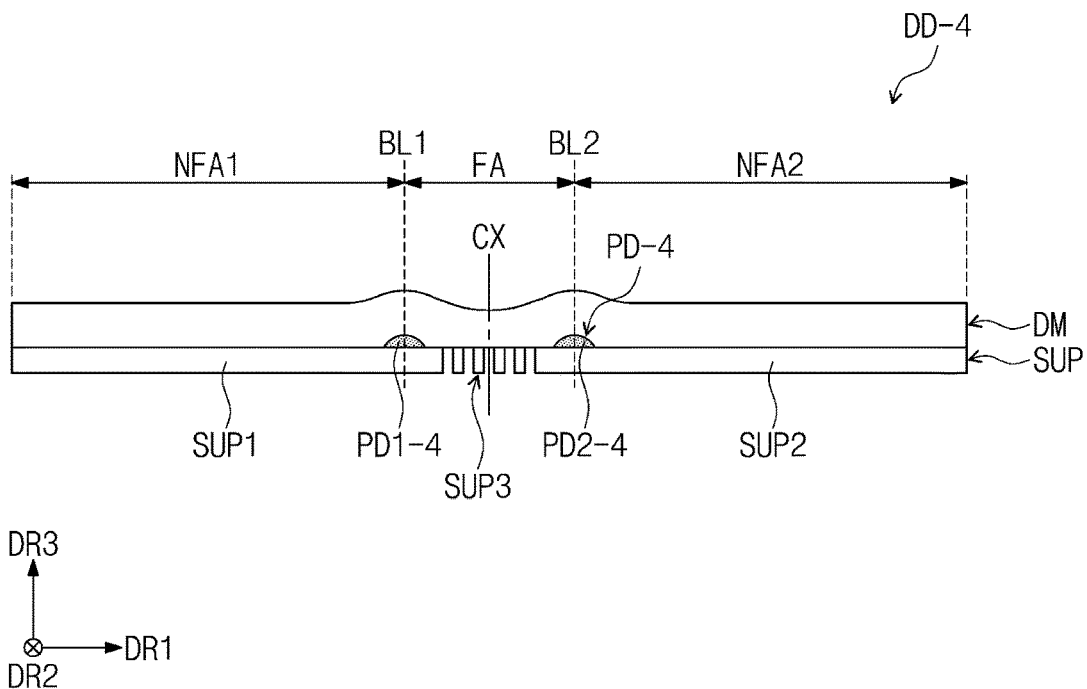
FIGS. 18 to 20 illustrate cross-sectional views showing embodiments of a display device.
Figure 19:
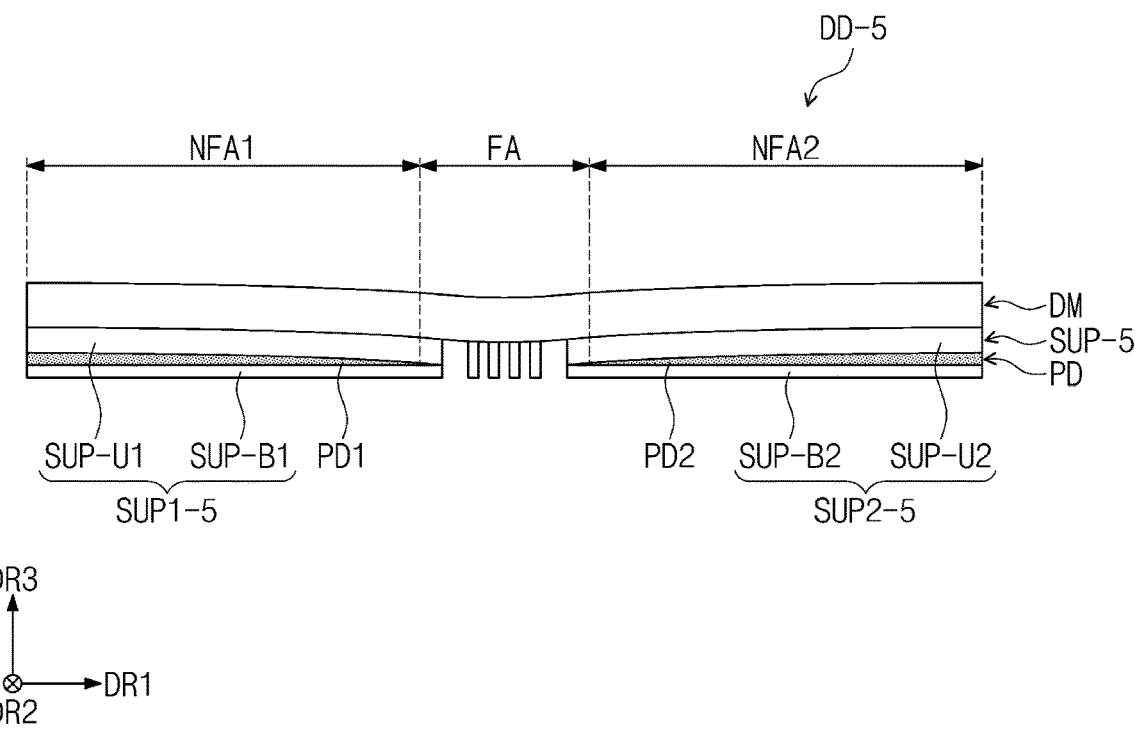
Figure 20:
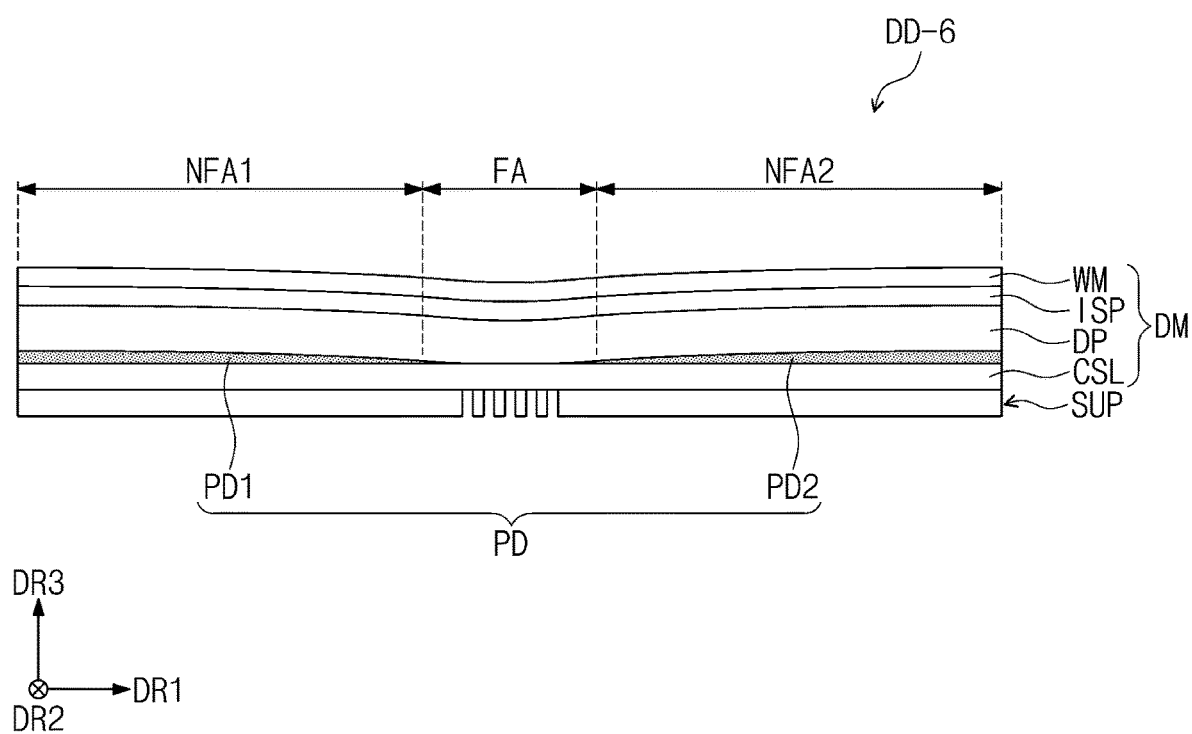

FIGS. 18 to 20 illustrate cross-sectional views showing embodiments of a display device DD. Similar to the display device DD shown in FIG. 14, display device DD-4, display device DD-5 and display device DD-6 illustrated in FIGS. 18 to 20 may be folded outwardly (e.g., out-folded or be out-foldable).

Referring to FIG. 18, the display device DD-4 may include a pad PD-4 (e.g., pad layer) that is in each of the first and second non-folding areas NFA1 and NFA2. The pad PD-4 which is in each of the first and second non-folding areas NFA1 and NFA2 respectively extends from the first and second non-folding areas NFA1 and NFA2 toward the central axis CX or the center of the folding area FA. Therefore, the pad PD-4 may overlap or correspond to at least a portion of the folding area FA. That is, the pad PD-4 is disposed in both the folding area FA and the non-folding area of the display device DD-4.

At the first boundary BL1, a third pad PD1-4 may be disposed to overlap or correspond to a portion of the first non-folding area NFA1 and a portion of the folding area FA. In an embodiment for example, in a view along the second direction DR2, the third pad PD1-4 may have an approximately semicircular shape in cross-section. At the second boundary BL2, a fourth pad PD2-4 may be disposed to overlap or correspond to a portion of the second non-folding area NFA2 and a portion of the folding area FA. In a view along the second direction DR2, the fourth pad PD2-4 may have an approximately semicircular shape in cross-section.

Since the pad PD-4 is under the display module DM, the top surface of the display module DM may include an upwardly protruded portion corresponding to the first and second boundaries BL1 and BL2, and a downwardly recessed portion corresponding to the central axis CX. The upwardly protruded portion of the top surface of the display module DM may be defined by respective portions in the folding area FA and a non-folding area.

Referring to FIG. 19, the pad PD of the display device DD-5 may be disposed within a supporter SUP-5. In an embodiment, for example, the supporter SUP-5 may include a plurality of supporters including a first supporter SUP1-5 and a second supporter SUP2-5 which are disconnected from each other at the folding area FA. The first supporter SUP1-5 may include a first upper supporter SUP-U1 and a first lower supporter SUP-B1. The second supporter SUP2-5 may include a second upper supporter SUP-U2 and a second lower supporter SUP-B2.

The first and second upper supporters SUP-U1 and SUP-U2 may be disposed below the display module DM. The first and second lower supporters SUP-B1 and SUP-B2 may be disposed below the first and second upper supporters SUP-U1 and SUP-U2, respectively. That is, the first and second lower supporters SUP-B1 and SUP-B2 face the display module DM with the first and second upper supporters SUP-U1 and SUP-U2 respectively therebetween.

The first pad PD1 may be disposed between the first upper supporter SUP-U1 and the first lower supporter SUP-B1, while overlapping or corresponding to the first non-folding area NFA1. The second pad PD2 may be disposed between the second upper supporter SUP-U2 and the second lower supporter SUP-B2, while overlapping or corresponding to the second non-folding area NFA2.

The first pad PD1 may be fixed to a top surface of the first lower supporter SUP-B1 and in contact with a bottom surface of the first upper supporter SUP-U1. The second pad PD2 may be fixed to a top surface of the second lower supporter SUP-B2 and in contact with a bottom surface of the second upper supporter SUP-U2. However, the first and second pads PD1 and PD2 are not limited to the fixed positions described above. The pads PD1 and PD2 may be fixed to the bottom surfaces of the upper supporters SUP-U1 and SUP-U2 and in contact with the top surfaces of the lower supporters SUP-B1 and SUP-B2, respectively.

Referring to FIG. 20, the pad PD of the display device DD-6 may be disposed within the display module DM. In an embodiment, for example, the pad PD may be disposed between the cushion layer CSL and the display panel DP of the display module DM. Alternatively, the pad PD may be disposed between the window WIN and the input sensing part ISP or between the display panel DP and the input sensing part ISP.

In one or more embodiment, the pad PD may cause the display module DM to undergo pre-deformation at the top surface thereof. The pre-deformed portions of the top surface of the display module DM may compensate for deformation of the display module DM which is caused by repeated folding and unfolding of the display device DD, and thus the deformation of the display module DM may be externally invisible.

According to one or more embodiment, a top surface of a display module DM may be pre-deformed by a pad PD disposed between a display panel DP and a supporter SUP. The pre-deformed portions of the top surface of the display module DM may compensate for deformation of the display module DM caused by repeated folding and unfolding of a display device DD, and thus the deformation corresponding to a folding area FA may not be recognized from outside the display device DD.

Although the invention is described in conjunction with embodiments thereof, it would be understood by those skilled in the art that the invention can be modified or changed in various ways without departing from spirit and scope of the invention defined by the appended claims. Further, the embodiments disclosed herein are not intended to limit the technical spirit of the invention and all technical spirit within the claims and their equivalents should be construed as being included in the invention.

What is claimed is:
1. A display device, comprising:
   a display panel including:
      a folding area at which the display device is foldable or unfoldable about a folding axis, and
      a non-folding area adjacent to the folding area;

a supporter which faces the folding area and the non-folding area; and in the folding area, a pad between the display panel and the supporter, the pad protruding from the supporter to the display panel and extending parallel to the folding axis, wherein the display panel includes a top surface which is furthest from the supporter, and a height of the display panel is defined at the top surface of the display panel, and the height of the display panel at the folding area is different from the height of the display panel at the non-folding area, according to a shape of the pad.

2. The display device of claim 1, wherein the non-folding area includes a plurality of non-folding areas including a first non-folding area and a second non-folding area;

the folding area is between the first non-folding area and the second non-folding area;

the supporter includes a plurality of supporters including a first supporter which corresponds to the first non-folding area and a second supporter which corresponds to the second non-folding area; and the pad includes a plurality of pads including:
a first pad in the folding area, between the display panel and the first supporter; and
a second pad in the folding area, between the display panel and the second supporter.

3. The display device of claim 1, further comprising a boundary between the folding area and the non-folding area, wherein the folding area includes a center, the pad includes a top surface which is furthest from the supporter and a height defined at the top surface, and the height of the pad decreases in a direction from the center of the folding area toward the boundary between the folding area and the non-folding area.

4. The display device of claim 3, wherein the supporter includes a top surface which is closest to the display panel, the pad includes a bottom surface which is opposite to the top surface of the pad, the bottom surface of the pad is parallel to the top surface of the supporter, and the top surface of the pad is curved surface.

5. The display device of claim 1, further comprising a subsidiary pad between the display panel and the supporter, the subsidiary pad protruding from the supporter to the display panel and extending parallel to the folding axis, wherein the subsidiary pad corresponds to the non-folding area.

6. The display device of claim 5, wherein the subsidiary pad includes a top surface which is furthest from the supporter and a height defined at the top surface, and the height of the first subsidiary pad decreases in a direction from the non-folding area toward the folding area.

7. The display device of claim 1, wherein the display device which is in-folded about the folding axis disposes portions of the top surface facing each other.

8. The display device of claim 1, further comprising a cushion layer between the display panel and the supporter.

9. The display device of claim 8, wherein the pad is between the cushion layer and the supporter.

10. The display device of claim 8, wherein the pad is between the display panel and the cushion layer.

11. The display device of claim 1, wherein the supporter includes a plurality of supporters including:
an upper supporter; and
a lower supporter which faces the display panel with the upper supporter therebetween, and the pad is between the upper supporter and the lower supporter, the pad protruding from the lower supporter to the upper supporter.

12. A display device, comprising:

a display panel including:
a folding area at which the display device is foldable or unfoldable about a folding axis, and
a non-folding area adjacent to the folding area;

a supporter which faces the non-folding area; and in the non-folding area, a pad between the display panel and the supporter, the pad protruding from the supporter to the display panel and extending parallel to the folding axis, wherein the display panel includes a top surface which is furthest from the supporter and a height of the display is defined at the top surface of the display panel, and the height of the display panel at the folding area is different from the height of the display panel at the non-folding area according to a shape of the pad.

13. The display device of claim 12, wherein the non-folding area includes a plurality of non-folding areas including a first non-folding area and a second non-folding area spaced apart from each other with the folding area therebetween;

the supporter includes a plurality of supporters including a first supporter which corresponds to the first non-folding area and a second supporter which corresponds to the second non-folding area; and the pad includes a plurality of pads including:
a first pad in the first non-folding area, between the display panel and the first supporter; and
a second pad in the second non-folding area, between the display panel and the second supporter,
wherein the first pad is spaced apart from the second pad, at the folding area.

14. The display device of claim 12, wherein the pad includes a top surface which is furthest from the supporter and a height defined at the top surface, and the height of the pad decreases in a direction toward the folding area from the non-folding area.

15. The display device of claim 12, wherein the pad extends in a direction toward the folding area from the non-folding area, to define a portion of the pad in the folding area.

16. The display device of claim 12, wherein the display device which is out-folded about the folding axis disposes portions of the top surface facing away from each other.

17. The display device of claim 12, further comprising a cushion layer between the display panel and the supporter, wherein the pad is between the cushion layer and the supporter.

18. The display device of claim 12, wherein the supporter includes a plurality of supporters including:
an upper supporter; and
a lower supporter which faces the display panel with the upper supporter therebetween, wherein the pad is between the upper supporter and the lower supporter, the pad protruding from the lower supporter to the upper supporter.

19. The display device of claim 1, wherein the top surface of the display panel at the folding area defines a protruded portion of the display panel at the folding area, the height being maximum at the protruded portion, and the pad corresponds to the protruded portion of the display panel.

20. The display device of claim 12, wherein the top surface of the display panel at the folding area defines a recessed portion of the display panel at the folding area, and the height of the display panel is maximum at a position corresponding to the pad and is minimum at the recessed portion.

\* \* \* \* \*